United States Patent [19]

Iwamatsu et al.

[11] Patent Number: 5,196,969
[45] Date of Patent: Mar. 23, 1993

[54] HEAD POSITIONING SYSTEM FOR SERPENTINE MAGNETIC RECORDING/REPRODUCING SYSTEM

[75] Inventors: Tadashi Iwamatsu; Tohru Okuda, both of Nara, Japan

[73] Assignee: Sharp Kabushiki Kaisha, Osaka, Japan

[21] Appl. No.: 498,571

[22] Filed: Mar. 26, 1990

[30] Foreign Application Priority Data

| Mar. 31, 1989 [JP] | Japan | 1-81708 |
|---|---|---|
| Mar. 31, 1989 [JP] | Japan | 1-81709 |
| Mar. 31, 1989 [JP] | Japan | 1-81710 |
| Oct. 31, 1989 [JP] | Japan | 1-285378 |
| Oct. 31, 1989 [JP] | Japan | 1-285379 |

[51] Int. Cl.⁵ .......................... G11B 21/02; G11B 5/55
[52] U.S. Cl. ..................... 360/75; 360/78.02
[58] Field of Search ............... 360/77.01, 77.03, 77.12, 360/78.01, 78.02, 78.11, 107, 109, 63, 74.1, 75

[56] References Cited

U.S. PATENT DOCUMENTS

| 4,176,381 | 11/1979 | de Niet et al. | 360/77.12 |
| 4,392,163 | 7/1983 | Rijckaert et al. | 360/77.12 |
| 4,558,380 | 12/1985 | Porter | 360/63 |
| 4,639,796 | 1/1987 | Solhjell | 360/77.12 |
| 4,677,505 | 6/1987 | Nukada et al. | 360/77.12 |

FOREIGN PATENT DOCUMENTS

| 026524 | 8/1981 | European Pat. Off. |
| 56-74822 | 6/1981 | Japan |
| 59-168924 | 9/1984 | Japan |
| 60-107724 | 6/1985 | Japan |
| 60-107725 | 6/1985 | Japan |
| 62-183018 | 8/1987 | Japan |
| 62-183019 | 8/1987 | Japan |
| 63-64811 | 12/1988 | Japan |

OTHER PUBLICATIONS

H. Uchida et al "Stationary Head Digital Audio Tape Deck", Trans. IECE Japan, EA81-64, published on 1981.
M. Kato et al., "A Study of Stationary Head PCM Tape Recorder", Trans. IECE Japan, EA83-56, published on 1983.
T. Naitoh and H. Kyotani "Precision Machining and Mechanism", Sharp Engineering Report No. 28, pp. 7-13, published on 1984.

Primary Examiner—Jerry Smith
Assistant Examiner—Steven R. Garland
Attorney, Agent, or Firm—Nixon & Vanderhye

[57] ABSTRACT

A serpentine magnetic tape recording/reproducing system includes a combination head (21) having a plurality of magnetic heads (W,R). A head positioning system including a head operating unit (100) in conjunction with a head moving unit (110) changes the position of each head relative to a width of the tape (23) whereby each head can traverse a plurality of tracks (T). A light emitting unit (36) is disposed at a position confronting a first side of the magnetic tape for emitting light across the width of the magnetic tape (23). A light receiving unit (33) comprising a plurality of light receiving elements (34, 35) is disposed at a position confronting a second side of the magnetic tape for receiving the light emitted from the light emitting unit (36). The plurality of light receiving units (34, 35) are so disposed that outputs from the units (34, 35) have a predetermined relation which governs feedback control including at a time when the magnetic heads are changing tracks. The light receiving units (34, 35) are particularly positioned relative to the tracks (T) and with respect to one another.

12 Claims, 16 Drawing Sheets

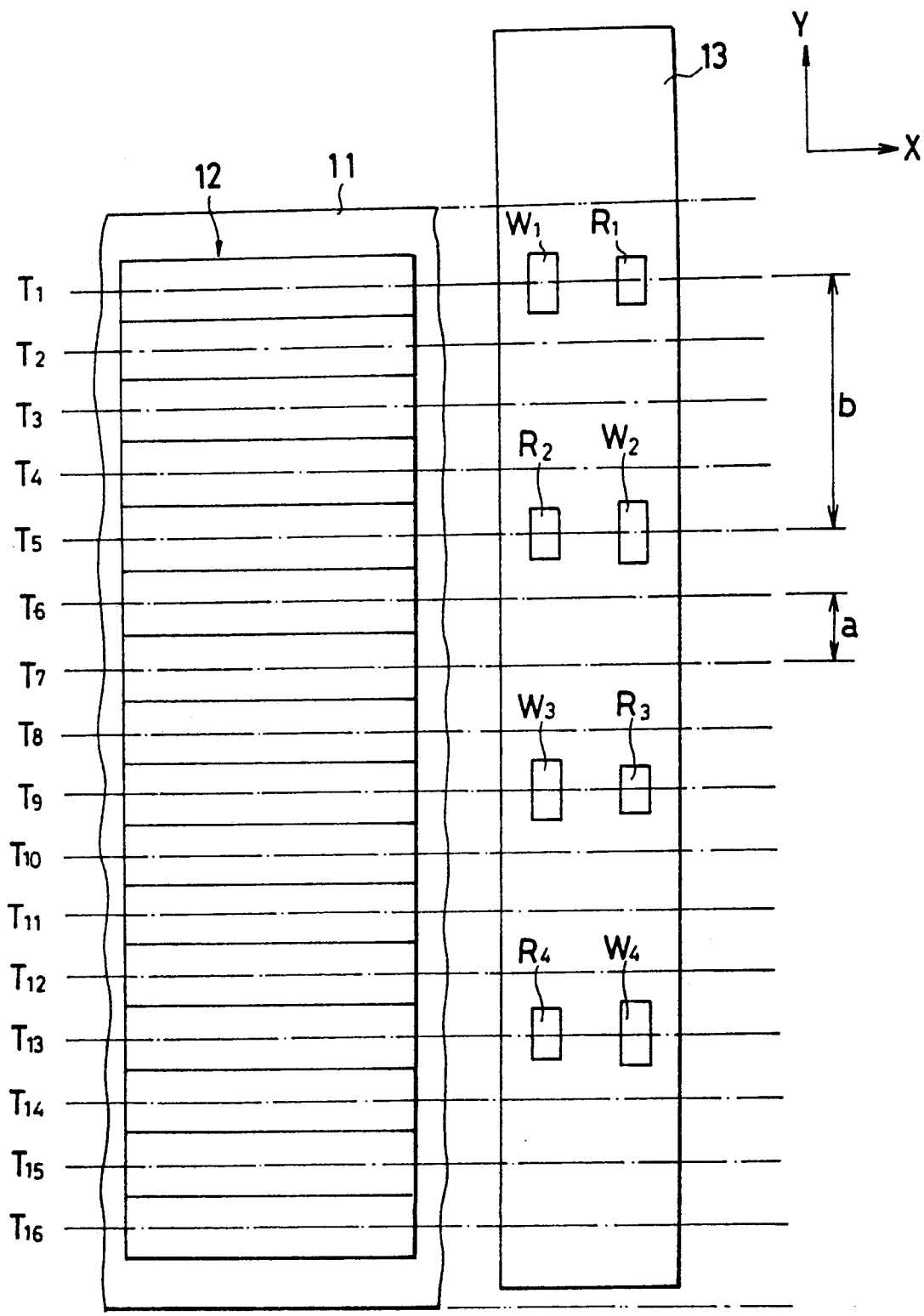

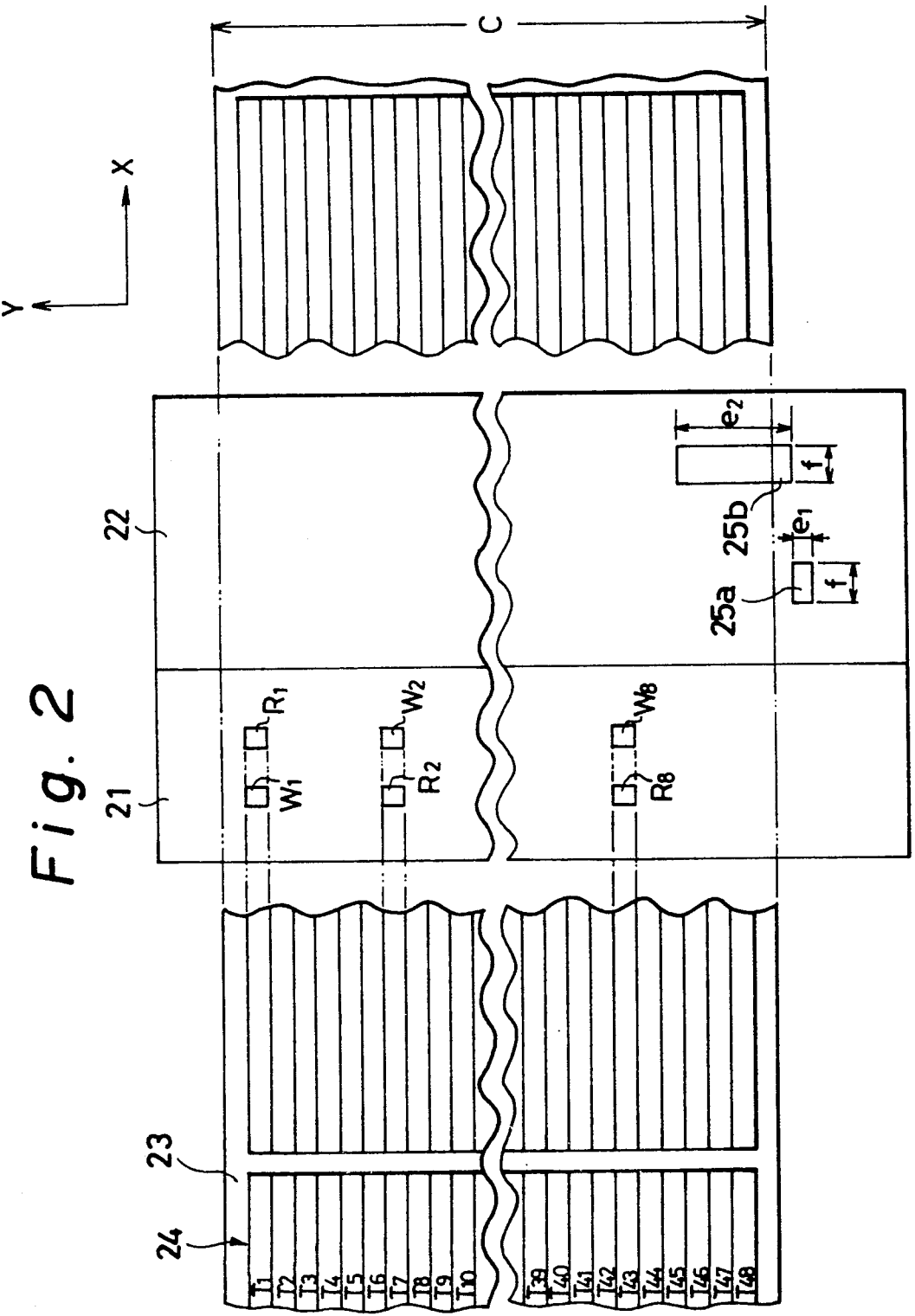

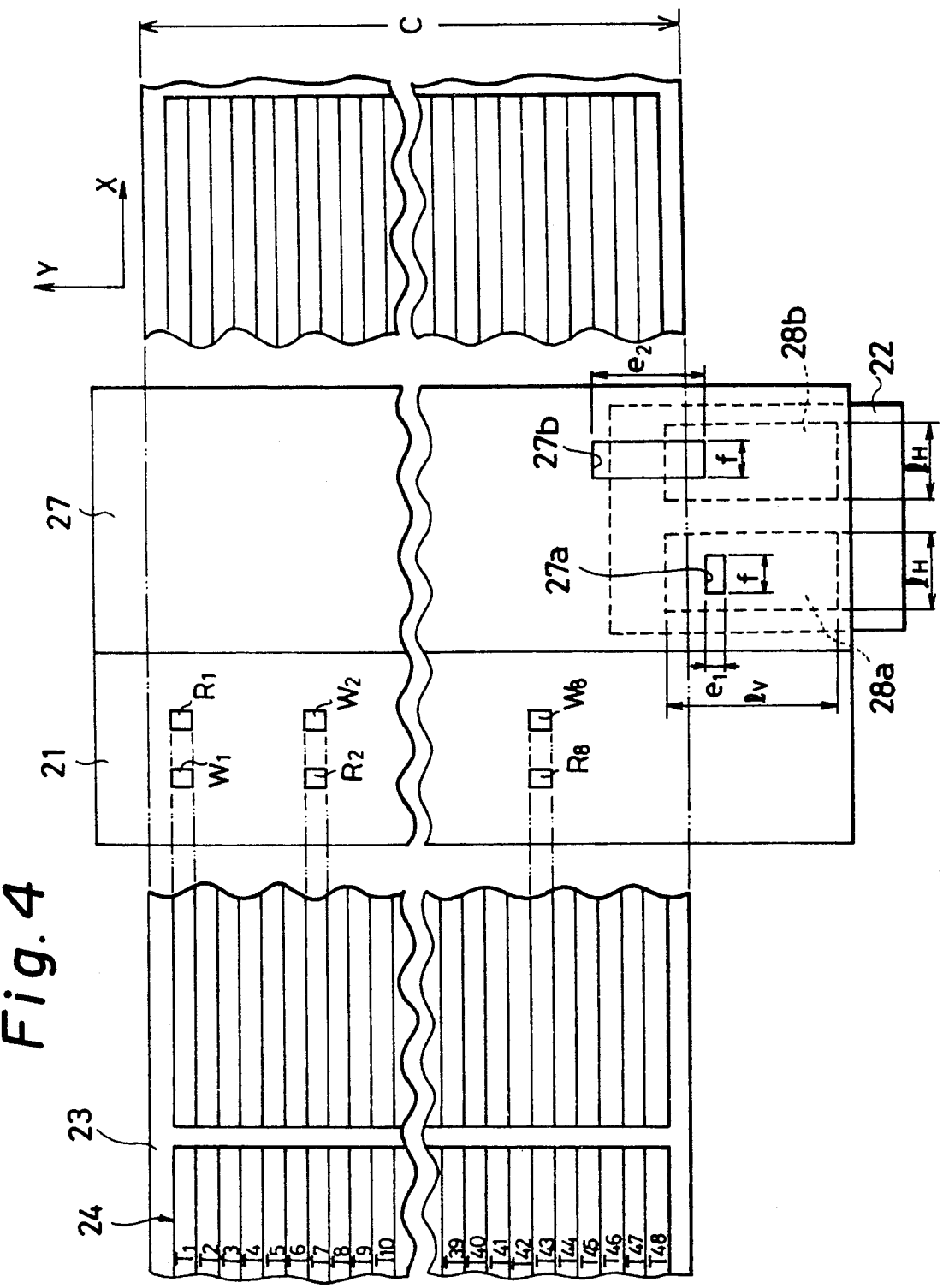

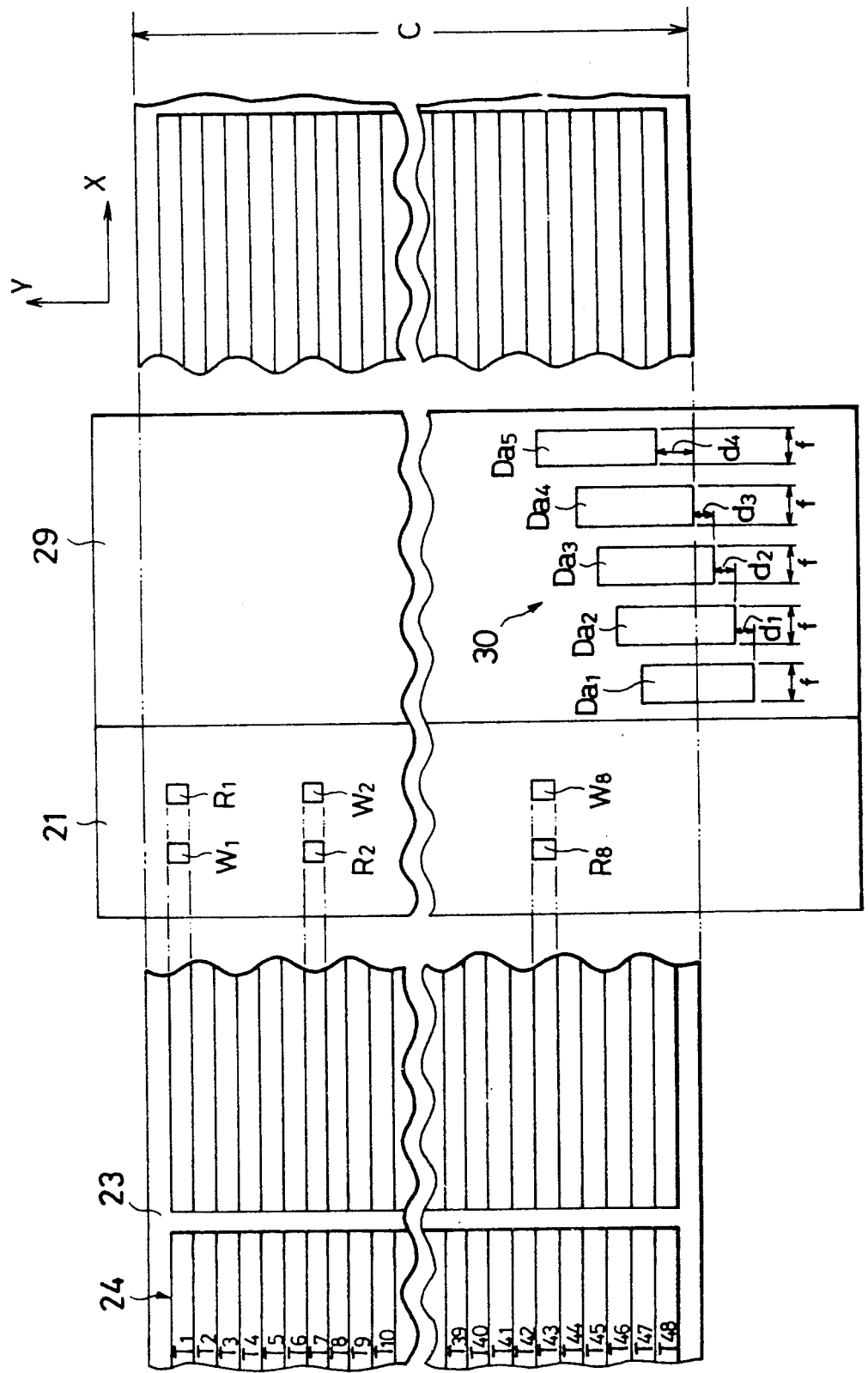

HEAD POSITIONING SYSTEM FOR SERPENTINE MAGNETIC RECORDING/REPRODUCING SYSTEM

BACKGROUND OF THE INVENTION

1. Field of the Invention

The present invention relates to a multi-track magnetic recording/reproducing apparatus which uses a magnetic tape having a reduced width as a recording medium. More particularly, the present invention relates to a magnetic recording/reproducing apparatus capable of precisely recording/reproducing a large amount of data at high speed and the precise recording/reproducing being performed with a precise tracking control maintained.

2. Description of the Related Art

The inventors know that a magnetic recording/reproducing apparatus, except the one having a rotary head, used for an audio device has the same numbers of the tracks and the recording heads or the same numbers of the reproducing heads and the recording heads in pairs. The above-described term "the number of the tracks" means the total number of data tracks formed in parallel to the direction in which the tape runs. The magnetic recording/reproducing apparatus of the above described type includes a device for restricting the relative positions between the magnetic tape and the magnetic head. The restricting device has generally a guide post or the like, having a pair of flanges for guiding the two vertical ends of the magnetic tape so as to make it run toward the fixed magnetic head, is formed in a passage through which the magnetic tape runs. Thus, the vertical movement of the magnetic tape is restricted.

On the other hand, a multi-track magnetic recording/reproducing apparatus used for a backup storage of an information processing system, so-called "a cassette streamer", employs a recording/reproducing system known as "a serpentine system". A conventional serpentine system has a pair of a recording head for recording and a reproducing head for reproducing the contents when a magnetic tape is run in one direction and another pair of a recording head for recording and a reproducing head for reproducing the contents when the magnetic tape is run in the other direction so that it is capable of corresponding to a plurality of tracks. In this system, information is successively recorded or reproduced from tracks during the running of the magnetic tape in one direction or in the other direction instead of recording information on a plurality of tracks of the magnetic tape simultaneously. At the time of the above-described operation, the tracks are switched by moving the above-described two pairs of the recording heads and the reproducing heads, and the positioning of the magnetic tape to the position of a desired track is simultaneously performed. There is a known device for restricting the relative positions between the head and the magnetic tape as disclosed in Japanese Patent Laid-Open No. 62-183019 in which the positioning of the head is achieved in accordance with an open loop control method with a stepping motor provided in which the restricting flanges are used in addition to the above described structure.

Recently, a combination head having a multi-heads has been developed in accordance with an advancement of a thin film magnetic head. Therefore, multi-track magnetic recording/reproducing apparatuses with further high density has been developed. The apparatus of the type described above is capable of recording information in a narrow track width, causing an allowable offtrack to be reduced. Therefore, in order to operate a precise tracking control, the device for restricting the relative positions between the tape and the head has an additional structure which followup-controls the magnetic head with respect to the waving movement of the magnetic head. The added structure is a head moving device for moving the magnetic head in the widthwise direction of a tape in addition to the above-described mechanism in which the flanges are provided for the purpose of restricting the vertical movement of the magnetic tape.

The apparatus of the type described above is exemplified by a fixed-head digital audio tape recorder which has the same numbers of the recording heads and the tracks or the same numbers of the reproducing heads each of which forms a pair with the above-described recording heads and the tracks. The apparatus of the type described above is arranged, as disclosed in the Trans. IECE Japan EA83-56, Trans. IECE Japan EA81-64 and the Sharp Engineering Report 1984-28, a servo-only track formed on the magnetic tape is traced by two parallel reproducing heads disposed in the widthwise direction of the tape so as to compare and followup-control the reproduction output therefrom for restricting the relative positions between the magnetic head and the magnetic tape.

Another device for restricting the relative positions between the tape and the head has been disclosed in Japanese Patent Publication No. 63-64811 in which a structure for magnetically detecting the relative positions between an end portion of the magnetic tape and the magnetic head is provided for a magnetic recording/reproducing apparatus arranged to have the same number of the heads and the tracks.

However, the device for restricting the relative positions between the tape and the head has a guide post having flanges which restrict the vertical movement of the magnetic tape by contacting the vertical ends of the magnetic tape with the flanges of the guide post. Therefore, if a magnetic tape having a width which is larger than the distance between the upper flange and the lower flange is driven, the mechanical stresses act upon the two vertical ends of the magnetic tape and cause the two vertical ends of the magnetic tape to be damaged. Therefore, the restriction width in the above-described restricting device is limited to several tens of $\mu$m, because the end portions of the magnetic tape must be protected from the damage. Consequently, in a high density magnetic recording/reproducing apparatus in which the allowable offtrack is arranged in the range from ten and several $\mu$m to several tens of $\mu$m, the above-described structure in which the movement of the magnetic tape is restricted by the flanges or the like cannot correspond to the above-described allowable offtrack.

When a higher recording density is desired, the width of the track of the magnetic tape can be reduced by reducing the width of the track of the magnetic head. However, the reduction in the track pitch involves a certain limit since the integration of the thin film head is limited to a certain degree. Furthermore, an increase in the number of the heads causes the size of the circuit to be enlarged and the overall cost is thereby risen. Therefore, a high density magnetic recording/reproducing apparatus which is provided with the pitch of the tracks is several tens of μm and the several tens to hundreds of tracks cannot employ the same number of the heads and the tracks.

On the other hand, the multi-track magnetic recording/reproducing apparatus so-called a cassette streamer and employing the conventional serpentine system is arranged to record/reproduce information on the multiplicity of the tracks by moving the magnetic head in the widthwise direction of the magnetic tape. Therefore, the recording/reproducing can be operated by moving the magnetic head in several times even if the track pitch is reduced and the number of the tracks is increased. Therefore, the integration of the thin film head does not encounter a problem.

However, the track width necessarily becomes several tens of μm when the track pitch is made several tens of μm. Therefore, the allowable offtrack also becomes ten and several μm to several tens of μm. It leads a fact that the device for restricting the relative positions between the tape and the head, in which the restriction by means of the flanges or the like and the open loop control by using the stepping motor are performed, does not correspond to the above-described allowable offtrack.

It might therefore be considered feasible to employ a structure for overcoming the above-described problem in terms of the allowable offtrack, the structure being arranged such that the relative positions between the magnetic head and the magnetic tape is detected by a sensor and the head operating device is feed-back controlled by a detection signal so that the magnetic head is tracking-controlled.

However, if the above-described tracking control of several μm is desired to be achieved, a mechanism for supporting the magnetic head, a power source for the magnetic head, a mechanism for transmitting power to the magnetic head, and a sensor for detecting the relative positions between the magnetic tape and the magnetic head must be constituted precisely. However, the conventional head operating device has a complicated structure and a large dead zone since it includes the power source utilizing a rotary motor such as the stepping motor, a mechanism for converting the rotational motion of the rotary motor into a linear motion, a bearing supporting mechanism and the like. Therefore, a desired control accuracy cannot be obtained. Furthermore, since a mechanism for supporting the magnetic head by means of parallel leaf springs is employed in the conventional structure, a feedback control with an excellent gain cannot be obtained easily due to an influence of the secondary resonance. The secondary resonance takes place because the magnetic head is secured to either of the leaf springs or because the mechanism for supporting the magnetic head is connected to the above-described mechanism for converting the rotational motion of the power source for the magnetic head into the linear motion.

Furthermore, if the tracking control by means of the servo track of the type employed in the above-described fixed-head digital audio tape recorder is operated in accordance with the serpentine method, a multi-servo tracks must be provided and problems in terms of a recording density on the servo track arise. Therefore, even if the method of this type is employed, the high density recording cannot be obtained satisfactorily.

SUMMARY OF THE INVENTION

An object of the present invention is to provide a magnetic recording/reproducing apparatus of a serpentine system capable of recording/reproducing a large amount of high density data at high speed with a tracking control for precisely positioning a combination head. The apparatus of the present invention is capable of recording/reproducing the data without providing flanges for restricting the relative positions between the magnetic tape and the magnetic head and without a servo track on the magnetic tape.

The object of the invention can be achieved by a magnetic recording/reproducing apparatus of serpentine system capable of recording/reproducing a large amount of high density data at high speed with a tracking control for precisely positioning a combination head includes a combination head having a magnetic head corresponding to a magnetic tape formed by a plurality of tracks arranged in parallel to one another in a direction in which the magnetic tape runs, a light emitting unit disposed at a position confronting one side of the magnetic tape for emitting light in a widthwise direction of the magnetic tape, a light receiving unit having a plurality of light receiving elements disposed at a position confronting the other side of the magnetic tape for receiving the light emitted from the light emitting unit such that the light receiving unit are so disposed that outputs from the light receiving elements have a predetermined relation which governs the feedback control at a time when the magnetic head is moved to a predetermined track position, and a head operating unit capable of moving the combination head in the widthwise direction of the magnetic tape.

Preferably, the combination head includes the light receiving elements disposed at an end portion in the widthwise direction of the magnetic tape, the light receiving elements disposed at the end portion being arranged in parallel with light receiving elements disposed at the other portion in a pair correspond to a predetermined track of the magnetic tape.

Furthermore, the light emitting unit is disposed at a position which confronts the light receiving elements via two end portions of the magnetic tape.

The light receiving unit may preferably be formed integrally with the combination head and has a first light receiving element of a light receiving area $Sa_1$ and a second light receiving element of a light receiving area $Sb_1$ with a relation of $Sb_1 \geq n \times Sa_1$ where n represents a positive integer, and the predetermined relation is $Eb_1 = m \times Ea_1$ where m represents a positive integer satisfying $1 \leq m \leq n$ and differs in accordance with each of relative positions between the magnetic head and the plurality of tracks in a movable range of the magnetic head.

More preferably, the light receiving unit is formed integrally on the combination head and has n pieces of light receiving elements of $Da_1$ to $Da_n$ with the same width in a direction in which the magnetic tape runs, where n represents a positive integer satisfying the relation of $n \geq 3$, a direction of the widthwise end portion of the magnetic tape is arranged to be $-Y$ direction and a direction of the other end portion of the magnetic tape is arranged to be $+Y$ direction, the light receiving elements $Da_1$ to $Da_n$ are disposed in the $-Y$ direction as well as in a direction in which the magnetic tape runs, the $-Y$ directional end portion of the light receiving element $Da_1$ is positioned in the $-Y$ direction by the largest degree among the light receiving elements of $Da_1$ to $Da_n$, a $-Y$ directional end portion of the light receiving element $Da_n$ is disposed at the n-th order in the $-Y$ direction when the light receiving element $Da_1$ is arranged as the first light receiving element, and assuming that i represents a positive integer satisfying the relationship $1 \leq i \leq n-1$, a pitch between a $-Y$ directional end portion of the i-th light receiving device $Da_i$ and a $-Y$ directional end portion of the $i+1$-th light receiving device $Da_{i+1}$ is di, and the light receiving devices $Da_1$ to $Da_n$ hold relative positions $di = d$ when $i \leq 2$ and $di = (i-2) \times d$ when $3 \leq i \leq n-i$, and the light receiving elements $Da_1$ to $Da_n$ are disposed such that an output difference between two of the light receiving elements $Da_1$ to $Da_n$ due to light emitted from the light emitting unit becomes an output from a light receiving element at a time when the magnetic tape is moved to an optional track position with respect to the $-Y$ directional end, and a relation among outputs from the three light receiving elements differs in accordance with each of relative positions between the magnetic tape and the combination head.

The light emitting unit may preferably be disposed at a position confronting the light receiving devices $Da_1$ to $Da_n$ with the $-Y$ directional end of the magnetic tape disposed therebetween, and the predetermined relation is formed among the three light receiving elements.

The object of the invention can be also achieved by a magnetic recording/reproducing apparatus of serpentine system capable of recording/reproducing a large amount of high density data at high speed with a tracking control for precisely positioning a combination head includes a combination head having a magnetic head corresponding to a magnetic tape formed by a plurality of tracks arranged in parallel to one another in a direction in which the magnetic tape runs, a slit formed integrally with the combination head and having openings whose number is the same as the number of a plurality of tracks confronting the magnetic head in the widthwise end portion and the other end portion of the magnetic tape, a light emitting unit disposed in a position confronting one side of the magnetic tape and capable of emitting light through an end portion in a widthwise direction of the magnetic tape, a light receiving unit having a plurality of light receiving elements disposed at a position confronting the other side of the magnetic tape for receiving the light emitted from the light emitting unit such that the light receiving unit are so disposed that outputs from the light receiving elements have a predetermined relation which governs the feedback control at a time when the magnetic head moved to a predetermined track position, and a head operating unit capable of moving the combination head in the widthwise direction of the magnetic tape.

Preferably, the light receiving unit is formed independently from the combination head and the light receiving elements are disposed at a position which confronts the opening of the slit plate formed at the end portion, and the openings are placed in parallel with the opening at the other end portion in the widthwise direction of the magnetic tape to one another with the openings in a pair correspond to a predetermined track of the magnetic tape.

The slit plate may preferably has openings at the end portion and the openings at the other end portion so disposed that outputs from the light receiving elements due to light emitted from the light emitting unit via a pair of opening corresponding to the track and to the two widthwise end portions of the magnetic tape establish the predetermined relationship.

Preferably, the light emitting unit is disposed at a position confronting the light receiving element via the two widthwise end portions of the magnetic tape and the slit plate.

Furthermore, the combination head is supported between free ends of two parallel leaf springs, one end-portion of one of the parallel leaf springs being secured and the other one end-portion thereof formed the free end.

The head operating unit may include a voice coil type linear motor, and a magnetic circuit of the voice coil type linear motor is closed in a direction of the combination head and in a direction of the magnetic tape.

Preferably, the apparatus further includes a movable portion connected to the coil and disposed between the free ends, the movable portion having the combination head and a supporting member for supporting the combination head and capable of synchronizing with a movement of the a coil of the voice coil type linear motor so as to make power of the voice coil type linear motor pass through a portion in the vicinity of the center of gravity of the movable portion.

The apparatus may further include detection unit for optically detecting the relative position between the combination head and either one or both of widthwise directional edges of the magnetic tape, and the detecting unit outputs a signal which controls a switching operation of the tracks and the relative position between the magnetic tape and the combination head.

Preferably, the combination head is disposed at a position confronting the side of the magnetic tape and has a first opening of an opening $Sa_2$ and a second opening of an opening area $Sb_2$ which are integrally formed with the combination head.

The slit plate may be disposed the other side in which the opening area $Sa_2$ and the opening $Sb_2$ holds the relationship $Sb_2 \geq n \times Sa_2$, where n represents a positive integer, and the light receiving unit formed independently from the combination head is disposed at a position confronting the other side of the magnetic tape and has a first light receiving element corresponding to the first opening and a second light receiving element corresponding to the second opening.

The first opening and the second opening are preferably disposed to the widthwise end portion of the magnetic tape, and an output $Ea_2$ from the first light receiving element and an output $Eb_2$ from the second light receiving element holds the relationship $Eb_2 = m \times Ea_2$ where m represents a positive integer satisfying the relation of $1 \leq m \leq n$ and differing in accordance with each of relative positions between the magnetic head and the plurality of tracks in a range in which the magnetic head can move.

Furthermore, the emitting unit is disposed at a position confronting the first light receiving element and the second light receiving element with the slit plate and the widthwise end portion of the magnetic tape disposed therebetween, and a feedback control of the apparatus is controlled by the first and second openings having a relation of $Eb_2 = m \times Ea_2$ in accordance with the output $Ea_2$ and the output $Eb_2$.

More preferably, the slit plate has n pieces of opening $A_1$ to $A_n$ having the same width in a direction in which the magnetic tape runs on the other side of the magnetic tape where n represents a positive integer satisfying the relation of $n \geq 3$, and n pieces of light receiving elements $Db_1$ to $Db_n$ respectively corresponding to the openings $A_1$ to $A_n$ are independently formed with respect to the combination head on the one side of the magnetic tape, a direction of the widthwise end portion of the magnetic tape is arranged to be $-Y$ direction and a direction of the other end portion of the magnetic tape is arranged to be $+Y$ direction, the opening $A_1$ to $A_n$ are disposed in a $-Y$ direction and in the direction in which the magnetic tape runs when a direction of the widthwise end portion of the magnetic tape is arranged to be $-Y$ direction and a direction of the other end portion of the magnetic tape is arranged to be $+Y$ direction, a $-Y$ directional end portion of the opening $A_1$ is positioned in the $-Y$ direction by the largest degree among the opening $A_1$ to $A_n$, an $-Y$ directional end portion of the openings $A_n$ is disposed at the n-th order in the $-Y$ direction when the opening $A_1$ is selected as the first opening, assuming that i represents a positive integer satisfying the relation of $1 \leq i \leq n-1$, a pitch between a $-Y$ directional end portion of the i-th opening $A_1$ and a $-Y$ directional end portion of the $\pm 1$-th opening $A_1 + 1$ is di, the openings $A_1$ to $A_n$ hold the relative positions $di = d$ when $i \leq 2$ and $di = (i-2) \times d$ when $3 \leq i \leq n-1$, the openings $A_1$ to $A_n$ are disposed such that an output difference between two of the light receiving elements $Db_1$ to $Db_n$ due to light emitted from the light emitting unit becomes an output from a light receiving element at a time when the magnetic tape moved to an optional track position with respect to the $-Y$ directional end, and a relation among output from the three light receiving elements differs in according with each of relative positions between the magnetic tape and the combination head.

Preferably, the light emitting unit is disposed at a position confronting the light receiving devices $Db_1$ to $Db_n$ with the $-Y$ directional end of the magnetic tape disposed therebetween, and the predetermined relation is an output relation among the three light receiving elements due to light emitted from the light emitting unit via the $-Y$ directional end of the magnetic tape and the openings $A_1$ to $A_n$.

According to a magnetic recording/reproducing apparatus according to the present invention, when data on a predetermined track of a magnetic tape is reproduced, a combination head is operated by a head operating unit so that a predetermined magnetic head of the combination head is moved to a position of the predetermined track of the magnetic tape. In accordance with this movement, a first and a second light-receiving device integrally provided with the combination head are simultaneously moved. As a result of the above-described movement, the light receiving surface of the second light-receiving device is shielded at an end portion of the magnetic tape, causing the quantity of received light emitted from light emitting unit to be changed. Accordingly to the present invention, a light-receiving area $Sa_1$ of the first light-receiving device and a light-receiving area $Sb_1$ of the second light-receiving device hold a relationship $Sb_1 \geq n \times Sa_1$ (where n represents a positive integer). The first light-receiving device and the second light-receiving device are positioned such that an output level $Ea_1$ from the first light-receiving device due to incident light from the light emitting unit and an output level $Eb_1$ from the second light-receiving device due to the incident light from the light emitting unit hold a relationship $Eb_1 = m \times Ea_1$ ($1 \leq m \leq n$, where m represents a positive integer) when the magnetic track moved to an optional track position.

Furthermore, the above-described numeral m corresponds to each of the relative positions between a predetermined magnetic head of the combination head and a plurality of the tracks positioned in the range in which the magnetic head can be moved, the numeral m being arranged to become different in accordance with each of the above-described relative positions. Therefore, the head operating unit operates a feedback control by calculating the output levels $Ea_1$ and $Eb_1$ from the corresponding the first and the second light-receiving devices so as to make the output levels $Ea_1$ and $Eb_1$ establish a relationship $Eb_1 = m \times Ea_1$ which includes the numeral m corresponding to the relative positions between the above-described magnetic head and the tracks. As a result, the relative positions between the magnetic head and the tracks are followup-controlled so that the relative positions are maintained as desired.

Accordingly a followup track control of about several $\mu m$ and a track switching operation of about hundreds of $\mu m$ to several $\mu m$ can be operated by a head operating unit. Therefore, a large amount of data can be precisely magnet-recorded/reproduced from on several tens to hundreds of tracks whose pitch is several tens of $\mu m$.

The accuracy of positioning the first and the second light-receiving devices can be achieved satisfactorily since the above-described two devices are manufactured by a semiconductor technology, and an accurate position sensor can be manufactured.

In the magnetic recording/reproducing apparatus according to the present invention, when data on the predetermined track of a magnetic tape is reproduced, the combination head is operated so that a predetermined magnetic head is moved to a predetermined track position. In accordance with this movement, a slit plate integrally formed with the combination head is simultaneously moved. As a result of this movement, the light receiving surface of the second light-receiving device is shielded in the periphery of the second opening formed in the slip plate, causing the quantity of received light emitted from light emitting unit to be changed. According to the present invention, a light-receiving area $Sa_2$ of the first opeing formed in the slit plate and a light-receiving area $Sb_2$ the second opening hold a relationship $Sb_2 \geq n \times Sa_2$ (where n represents a positive integer). The first light-receiving device corresponding to the first opening and the second light-receiving device corresponding to the second opening are formed independently from the combination head on the opposite side of the slit plate confronting the magnetic tape. Furthermore, the first opening and the second opening are positioned such that an output level $Ea_2$ from the first light-receiving device due to incident light from the light emitting unit and an output level $Eb_2$ from the second light-receiving device due to the incident light from the light emitting unit hold a relationship $Eb_2 = m \times Ea_2$ ($1 \leq m \leq n$, where m represents a positive integer) when the magnetic track moved to an optional track position. Furthermore, the above-described numeral m corresponds to each of the relative positions between a predetermined magnetic head of the combination head and a plurality of the tracks positioned in the range in which the magnetic head can be moved, the numeral m being arranged to become different in accordance with each of the above-described relative positions. Therefore, the head operating unit performs a feedback control by calculating the output levels $Ea_2$ and $Eb_2$ from the corresponding first and the second light-receiving devices so as to make the output levels $Ea_2$ and $Eb_2$ establish a relationship $Eb_2 = m \times Ea_2$ which includes the numeral m corresponding to the relative positions between the above-described magnetic head and the tracks. As a result, the relative positions between the magnetic head and the tracks are followup-controlled so that the relative positions between them is maintained as desired.

Accordingly, a large amount of data can be precisely magnet-recorded/reproduced similarly to the above-described magnetic recording/reproducing apparatus.

The accuracy at the time of positioning the first and the second openings in the slit plate can be achieved satisfactorily since the above-described two openings are manufactured by an etching technology, and an accurate position sensor can be manufactured.

According to a magnetic recordsing/reproducing apparatus according to the present invention, when data on a predetermined track of a magnetic tape is reproduced, a combination head is operated by a head operating unit so that a predetermined magnetic head of the combination head is moved to a position of the predetermined track of the magnetic tape. In accordance with this movement, n (where $n \geq 3$ and n represents a positive integer) pieces of light-receiving devices $Da_1$ to $Da_n$ integrally provided with the combination head are simultaneously moved. As a result of the above-described movement, the light receiving surface of all of the light receiving devices $Da_1$ to $Da_n$ or a predetermined light receiving device of the same is shielded at the end portion in the Y-direction of the magnetic tape, that is, at a widthwise end of the magnetic tape, causing the quantity of received light emitted from light emitting unit to be changed.

According to the present invention, the end portion in the $-Y$ direction of the above-described light receiving device $Da_1$ is positioned at the most $-Y$ directional end among the light receiving devices $Da_1$ to $Da_n$. Furthermore, the light receiving device $Da_n$ is the n-th light receiving device in the $-Y$ direction when counted with letting the light receiving device $Da_1$ be the first light receiving device. Assuming that the pitch between the $-Y$ directional end of the light receiving device $Da_1$ ($1 \leq i \leq n-1$, where i represents a positive integer) and that of the light receiving device $Da_{i+1}$ is di and the width of each of the tracks of the magnetic tape is d, the light receiving devices $Da_1$ to $Da_n$ has the positional relationship:

$di = d$ when $i \leq 2$ $di = (i-2) \times d$ when $3 \leq i \leq n-1$

The light receiving devices $Da_1$ to $Da_n$ are positioned so as to make the difference in the output between optional two light receiving devices of the light receiving devices $Da_1$ to $Da_n$ due to incident light from light emitting unit becomes the same as another optional light receiving device when the magnetic head moved to an optional track position with respect to the $-Y$ directional end of the magnetic tape. Furthermore, the relationship among the outputs from the above-described three light receiving devices is arranged to be different in accordance with the relative positions between the magnetic tape and the combination head. Therefore, the head operating unit operates a feedback control by calculating the outputs from the three light receiving devices corresponding to the relative positions between the magnetic tape and the combination head so as to make the difference in the output between the predetermined two light receiving devices the same as the other light receiving device. As a result, the relative positions between the magnetic head and the tracks are followup-controlled so that the relative positions between them is maintained as desired.

According to a magnetic recording/reproducing apparatus according to the present invention, when data on a predetermined track of a magnetic tape is reproduced, a combination head is operated so that a predetermined magnetic head is moved to a position of the predetermined track. In accordance with this movement, a slit plate integrally provided with the combination head is simultaneously moved. As a result of the above-described movement, the light receiving surface of all of the light receiving devices $Da_1$ to $Da_n$ or a predetermined light receiving device of the same is shielded at a periphery of each of openings $A_1$ to $A_n$, causing the quantity of received light emitted from light emitting unit to be changed.

According to the present invention, the end portion in the $-Y$ direction of the above described opening $A_1$ is positioned at the most $-Y$ directional end among the openings $Da_1$ to $Da_n$. Furthermore, opening $A_n$ is the n-th light receiving device in the $-Y$ direction when counted with letting the opening $A_1$ be the first opening. Assuming that the pitch between the $-Y$ directional end of the opening $A_i$ ($1 \leq i \leq n-1$, where i represents a positive integer) and that of the opening $A_{i+1}$ is di and the width of each of the tracks of the magnetic tape is d, openings $A_1$ to $A_n$ has the positional relationship:

$di = d$ when $i \leq 2$ $di = (i-2) \times d$ when $3 \leq i \leq n-1$

The openings $A_1$ to $A_n$ are positioned so that the difference in the output between optional two light receiving devices of the light receiving devices $Da_1$ to $Da_n$ due to incident light from light emitting unit becomes the same as another optional light receiving device when the magnetic head moved to an optional track position with respect to the $-Y$ directional end of the magnetic tape. Furthermore, the relationship among the outputs from the above-described three light receiving devices is arranged to be different in accordance with the relative positions between the magnetic tape and the combination head. Therefore, the head operating unit operates a feedback control by calculating the outputs from the three light receiving devices corresponding to the relative positions between the magnetic tape and the combination head so as to make the difference in the output between the predetermined two light receiving devices the same as the other light receiving device. As a result, the relative positions between the magnetic head and the tracks are followup-controlled so that the relative positions between them is maintained as desired.

The accuracy of positioning the openings $A_1$ to $A_n$ in the slit plate can be achieved satisfactorily since they are manufactured by an etching technology, and an accurate position sensor can be manufactured.

According to a magnetic recording/reproducing apparatus according to the present invention, when data on a predetermined track of a magnetic tape is reproduced, a combination head is operated by head operating unit so that a predetermined magnetic head of the combination head is moved to a position of the predetermined track of the magnetic tape. In accordance with this movement, a plurality of light receiving devices integrally provided with the combination head are simultaneously moved. As a result of the above-described movement, the light receiving surface of a light receiving device group at an end portion corresponding to the above-described predetermined track and a pair of light receiving devices at another end of the same is shielded by the two widthwise ends of the magnetic tape, causing the quantity of received light to be changed.

According to the present invention, a correspondent relationship is established between the light receiving devices of the light receiving device group at the one end and the light receiving devices of the light receiving device group at the other end. Furthermore, correspondent relationships are established between a pair of the corresponding light receiving devices and a predetermined track. Furthermore, the light receiving devices of the light receiving device group at the one end and the light receiving devices of the light receiving device group at the other end are positioned so as to make the output from each of the pair of the light receiving devices corresponding to the track has a certain relationship when the magnetic track moved to an optional track position. Therefore, the head operating unit operate a feedback control such that the output from each of the pair of the light receiving devices corresponding to the track due to incident light from light emitting unit via the two widthwise end portions of the magnetic tape has a certain relationship when the magnetic head moved to an optional track position. As a result, the relative positions between the magnetic head and the tracks are followup-controlled so that the relative positions between them is maintained as desired.

The accuracy at the time of positioning the light receiving devices can be achieved satisfactorily since they are manufactured by a semiconductor technology, and an accurate position sensor can be manufactured.

According to a magnetic recording/reproducing apparatus according to the present invention, when data on a predetermined track of a magnetic tape is reproduced, a combination head is operated so that a predetermined magnetic head is moved to a position of the predetermined track. In accordance with this movement, a slit plate integrally provided with the combination head is simultaneously moved. As a result of the above-described movement, a plurality of openings formed in the slit plate are also and simultaneously moved. Therefore, light is made incident through the opening group at an end portion which corresponds to the predetermined track and a pair of openings of the opening groups at another end upon the light receiving devices which correspond to these openings.

According to the present invention, a correspondent relationship is established between the openings at the end portion and those at the other end portion. Furthermore, correspondent relationships are established between a pair of the corresponding openings and a predetermined track. Furthermore, the openings of the opening group at the one end and the openings of the opening group at the other end are positioned so as to establish a certain relationship when the magnetic head moved to an optional track position, the relationship being the relationship between the outputs from the pair of the light receiving devices due to light made incident via the pair of openings corresponding to the track and the two widthwise end portions of the tape. Therefore, the head operating unit operates a feedback control such that the output from each of the pair of the light receiving devices corresponding to the above-described two openings due to incident light from light emitting unit via the two widthwise end portions of the magnetic tape has a certain relationship when the magnetic head of the combination head moved to an optional track position. As a result, the positional relationship between the magnetic head and the tracks are followup-controlled so that the positional relationship between them is maintained as desired.

The accuracy at the time of positioning the plurality of openings in the slit plate can be achieved satisfactorily since they are manufactured by an etching technology, and an accurate position sensor can be manufactured.

When the magnetic tape is allowed to run in a direction, a plurality of recording heads capable of recording data on the magnetic tape act to have data recorded on a plurality of tracks of the magnetic tape. Then, the magnetic tape is allowed to run in another direction, a plurality of recording heads capable of recording data on the magnetic tape act to have data recorded on another plurality of tracks of the magnetic tape.

Then, the combination head is moved in the widthwise direction of the magnetic tape by a distance of an integral multiple of the track pitch so as to cause the combination head to similarly perform the recording operation. Then, the above-described operation is repeated. The reproduction operation is arranged to be operated similarly to the recording operation.

According to the present invention, a voice coil type linear motor is used as the head operating unit. Therefore, the combination head can be operated without encountering problems in terms of a dead zone and of a frictional load. A servo control can be operated precisely with a satisfactory response achieved. Furthermore, the power of the voice coil type linear motor is arranged to be transmitted in the vicinity of the center of gravity of a movable portion which has a support member disposed between two free ends of two parallel leaf springs whose end portions are secured and the other end portions form free ends, and the combination head. Therefore, the influence of the secondary resonance can be reduced and the precision of the above-described servo control can be improved.

Furthermore, the leakage flux from the voice coil type linear motor influencing the combination head and the magnetic tape can be reduced by closing a magnetic circuit of the voice coil type linear motor in the direction to the combination head and the magnetic tape.

In addition, since the relative positions between the combination head and the tape edge can be optically detected and it is feed-backed to the head operating unit by a signal from the sensor, the combination head can be precisely positioned. Therefore, the necessity of recording the servo track for detecting the relative positions between the combination head and the magnetic tape on the magnetic recording medium can be eliminated.

That is, a combination head having recording heads and reproducing head each of whose number is smaller than the number of the tracks on the magnetic tape can be precisely positioned. As a result, the recording/reproducing large amount of high density data can be recorded/reproduced at high speed in accordance with the serpentine method.

Since the combination head is supported between free ends of two parallel leaf springs whose end portions are secured and the other end portions form free ends, the operation of the combination head can be servo-controlled with an influence of the secondary resonance of the supporting mechanism for the combination head eliminated. Furthermore, the use of the voice coil type linear motor as the head operating unit will cause a servo control to be achieved with the dead zone and the friction load satisfactorily eliminated. Furthermore, the voice coil type linear motor arranged to operate the portion in the vicinity of the movable portion including the combination head will improve the above-described effect.

Furthermore, since the relative positions between the combination head and the tape edge can be optically detected and it is feed-backed to the head operating unit by means of a sensor signal, the combination head can be precisely positioned.

Further objects and advantages of the present invention will be apparent from the following description of the preferred embodiments of the invention as illustrated in the accompanying drawings.

BRIEF DESCRIPTION OF THE DRAWINGS

FIG. 1 is a schematic front elevational view of the magnetic tape and the combination head for a magnetic recording/reproducing apparatus according to the present invention;

FIG. 2 is a front elevational view which illustrates the relative positions among a magnetic tape, a combination head and a light receiving device;

FIG. 4 is a front elevational view which illustrates the relative positions among the magnetic tape, the light receiving device of the combination head, the reference opening and an opening for detecting the positional relationship;

FIG. 6 is a front elevational view which illustrates the relative positions among the magnetic tape, the combination head and the light receiving device;

DESCRIPTION OF THE PREFERRED EMBODIMENTS

Figure 3A:
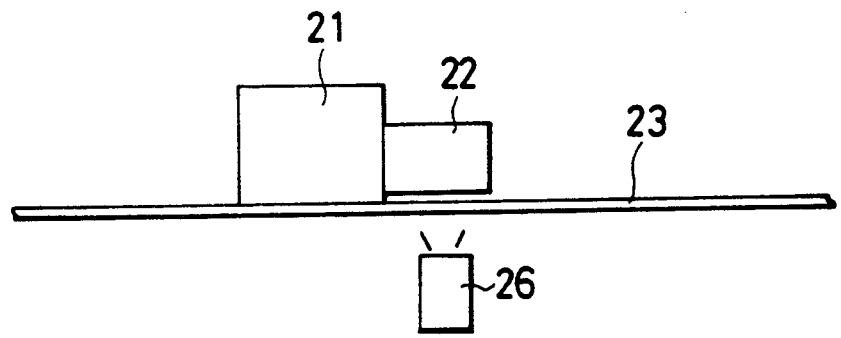
FIG. 3a is a schematic plan view which illustrates the relative positions among the magnetic tape, the combination head and the light-receiving device.

A first embodiment of the present invention will now be described with reference to FIGS. 1 to 3.

A magnetic recording/reproducing apparatus according to the present invention is to record and reproduce data in accordance with a serpentine method in which magnetic heads whose number is smaller than the number of the tracks of the magnetic tape used. First, the serpentine method which is used for the recording/reproducing apparatus according to the present invention will be described with reference to FIG. 1. Referring to FIG. 1, it is assumed that the direction in which a magnetic tape 11 runs is X and that the widthwise direction of the magnetic tape 11 is Y. A track group 12 is formed on the magnetic tape 11, the track group 12 having 16 tracks $T_1$ to $T_{16}$ in the direction Y at the same pitch a. A combination head 13 having four recording heads $W_1$ to $W_4$ and reproducing heads $R_1$ to $R_4$ which are integrally formed and disposed so as to correspond to the above-described track group 12. The recording heads $W_1$ to $W_4$ are in parallel provided in the direction Y at the same pitch b (b=4a), while the reproducing heads $R_1$ to $R_4$ are disposed in parallel in direction X or $-X$ in such a manner that they form pairs with the corresponding recording heads $W_1$ to $W_4$. The recording heads $W_1$ to $W_4$ and the reproducing heads $R_1$ to $R_4$ which form the pairs are alternately disposed in the direction Y.

When data is recorded or reproduced, the above-described combination head 13 is first moved to a position shown in FIG. 1. That is, it is moved to a position so as to make the center of the recording head $W_1$ and that of the reproducing head $R_1$ coincide with the center of the track $T_1$, the center of the recording head $W_2$ and that of the reproducing head $R_2$ coincide with the center of the track $T_5$, the center of the recording head $W_3$ and that of the reproducing head $R_3$ coincide with the center of the track $T_9$, and the center of the recording head $W_4$ and that of the reproducing head $R_4$ coincide with the center of the track $T_{13}$. Then, while maintaining the established relative positions, the magnetic tape 11 is allowed to run in the direction X when data is recorded so that data is simultaneously recorded on the tracks $T_1$ and $T_9$ by using the recording head $W_1$ and $W_3$. When the recording to the tape-end has been completed, the magnetic tape 11 is allowed to run in the $-X$ direction so that data is simultaneously recorded on the tracks $T_5$ and $T_{13}$ by using the recording heads $W_2$ and $W_4$. After the recording to the tape-end has been completed, the combination head 13 is moved in the $-Y$ direction by a distance a so that the center of the recording head $W_1$ and that of the reproducing head $R_1$ coincide with the center of the track $T_2$. While the established relative positions maintained, the magnetic tape 11 is again allowed to run in the direction X so that data is recorded on the tracks $T_2$ and $T_{10}$ by using the recording heads $W_1$ and $W_3$. After recording to the tape-end has been completed, the magnetic tape 11 is then allowed to run in the direction $-X$ so that data is recorded on the tracks $T_6$ and $T_{14}$ by using the recording heads $W_2$ and $W_4$. Similarly, data is recorded on all of the tracks $T_1$ to $T_{16}$. According to this embodiment, since the number of the reproducing heads and the number of the recording heads are respectively arranged to be four with respect to the 16 tracks, the relative positions between the magnetic tape 11 and the combination head 13 become four positions.

Now, a tracking control device of the magnetic recording/reproducing apparatus according to the present invention will be described with reference to FIGS. 2 and 3.

Figure 3B:
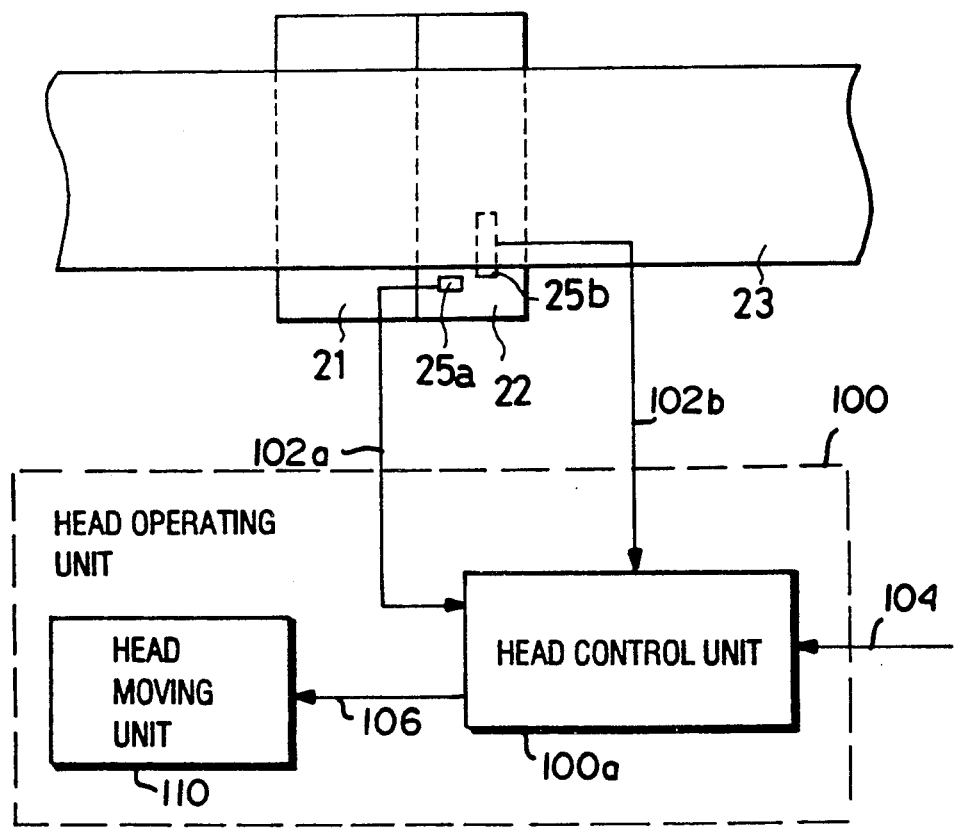
FIG. 3b is a front elevational view which illustrates the relative positions among the magnetic tape, the combination head and the light-receiving device.

As shown in FIGS. 2, 3a and 3b, the magnetic recording/reproducing apparatus includes the combination head 21 having a light-receiving device holding member 22 formed integrally with the combination head 21.

A magnetic tape 23 has a track group 24 constituted by the 48 tracks $T_1$ to $T_{48}$ formed in the direction Y at the same pitch as shown in FIG. 2. According to this embodiment, width C of the magnetic tape 23 is arranged to be ¼ inch and the track pitch is arranged to be 120 μm.

The combination head 21 includes 8 recording heads $W_1$ to $W_8$ and reproducing heads $R_1$ to $R_8$ which are integrally formed with the combination head 21. The recording heads $W_1$ to $W_8$ are disposed in the direction Y at a pitch of 720 μm, while the reproducing heads $R_1$ to $R_8$ are disposed in the direction X or $-X$ with forming pairs with the corresponding recording heads $W_1$ to $W_8$. The recording heads $W_1$ to $W_8$ and the reproducing heads $R_1$ to $R_8$ which form pairs are alternately disposed in the direction Y. When the magnetic tape 23 is allowed to run in the direction X, the four recording heads $W_1$, $W_3$, $W_5$ and $W_7$ of the combination head 21 perform the recording, while the magnetic tape 23 is allowed to run in the direction $-X$, the four recording heads $W_2$, $W_4$, $W_6$ and $W_8$ perform the recording. Furthermore, whenever the magnetic tape 23 reciprocates once, the combination head 21 is moved in the direction $-Y$ so that the combination head 21 is positioned at 6 relative positions with respect to the magnetic tape 23. As a result, all of the 48 tracks $T_1$ to $T_{48}$ are subjected to the data recording/reproducing.

Furthermore, the light-receiving device holding member 22 has a reference outputting light receiving device 25a serving as a first light receiving device and a light receiving device 25b for detecting the relative position and serving as a second light receiving device. The devices 25a and 25b are formed at positions corresponding to the $-Y$ directional end portion of the magnetic tape 23. The light receiving devices 25a and 25b can be moved in accordance with the movement of the combination head 21 in the $\pm Y$ directions since the light-receiving device holding member 22 is integrally formed with the combination head 21. The light receiving surface of the light receiving device 25a is arranged such that its Y directional width e1 is 120 μm which is the same width as that of the tracks $T_1$ to $T_{48}$ while its X directional width is f with which a sufficient output level can be obtained. The light receiving device 25b is formed near the light receiving device 25a. The light receiving device 25b has a light receiving surface whose X directional width is arranged to be f and whose Y directional width e2 is arranged be a proper value holding the relationship $e_2 \geq 720$ μm. The output level for a unit area of the two light receiving devices 25a and 25b are arranged to be the same. The reference-outputting light receiving device 25a is positioned such that it is not concealed by the magnetic tape 23. The light receiving device 25b for detecting the relative positions are provided such that its $-Y$ directional end appears from the $-Y$ directional end of the magnetic tape 23 when the recording head $W_1$ and the reproducing head $R_1$ are at the track position $T_1$. Furthermore, it is structured such that its light receiving area appearing from the magnetic tape 23 becomes enlarged in accordance with the movement of the combination head 21 in the direction $-Y$. When the combination head 21 is moved to each of the relative positions with respect to the magnetic tape 23, output $Ea_1$ from the light receiving device 25a and output $Eb_1$ from the light receiving device 25b hold the following relationship:

$Eb_1 = m \times Ea_1$ ($1 \leq m$, where m represents a positive integer)

The above-described numeral m represents the each of the relative positions between the reproducing head $R_1$ of the combination head 21 and the plurality of tracks $T_1$ to $T_6$ positioned in a range in which the reproducing head $R_1$ can move, the numeral m can be a different value in accordance with each of the relative positions. That is, according to this embodiment, for example, when the recording head $W_1$ moved to the positions of the tracks $T_1$, $T_2$, $T_3$, $T_4$, $T_5$ and $T_6$, each of the following relationships is established: $Eb_1 = Ea_1$, $Eb_1 = 2Ea_1$, $Eb_1 = 3Ea_1$, $Eb_1 = 4Ea_1$, $Eb_1 = 5Ea_1$ and $Eb_1 = 6Ea_1$.

The light receiving devices 25a and 25b are connected to a head operating unit 100. The head operating unit feedback-controls the combination head 21 in the $\pm Y$ directions so as to make outputs Ea1 and Eb1 from the light receiving devices 25a and 25b hold the relationship $Eb1 = m \times Ea1$. As a result, the relative positions between the magnetic tape 23 and the combination head 21 are held at predetermined positions as described above.

In the above regard, as shown in FIG. 3b, the head operating unit 100 includes a head control unit 100a and a head moving unit 110. The head control unit 100a is connected to receive output signals from the devices 25a and 25b on lines 102a and 102b, respectively. As understood from the ensuing discussion, the head control unit 100a also receives an "end of reciprocation"0 signal on line 104. Further, the head control unit 100a applies a control signal on line 106 to the head moving unit 110. The head moving unit 110 is described in more detail in connection with FIGS. 14 and 15.

As shown in FIGS. 3a, 3b, light emitting unit 26 capable of emitting light of a sufficient quantity to the light receiving devices 25a and 25b is disposed in a portion confronting the light receiving devices 25a and 25b with the $-Y$ directional end of the magnetic tape 23 disposed therebetween.

When all of the tracks $T_1$ to $T_{48}$ including the tracks $T_1$, $T_{13}$, $T_{25}$, and $T_{37}$ are subjected to the data reproduction operation of the magnetic recording/reproducing apparatus structured as described above, the combination head 21 is operated by the head operating unit so that the reproducing head $R_1$ and the track $T_1$, the reproducing head $R_3$ and the track $T_{13}$, the reproducing head $R_5$ and the track $T_{25}$ and the reproducing head $R_7$ and the track $T_{37}$ are moved to the corresponding relative positions with respect to the magnetic tape 23. At this time, the head operating unit moves the combination head 21 so as to make the output $Ea_1$ from the light receiving device 25a and the output $Eb_1$ from the light receiving device 25b hold the following relationship:

$$Eb_1 = Ea_1$$

Furthermore, the head operating unit make the combination head 21 follow the weaving of the magnetic tape 23 so that the relative positions between the magnetic tape 23 and the combination head 21 are maintained. Therefore, the relative position between the combination head 21 and the magnetic tape 23 can be held correctly. In this state, when the magnetic tape 23 is allowed to run in the X direction, the data on the tracks $T_1$, $T_{13}$, $T_{25}$ and $T_{37}$ are reproduced by the reproducing heads $R_1$, $R_3$, $R_5$ and $R_7$. When the reproduction to the end portion of the magnetic tape 23 has been completed, the magnetic tape 23 is allowed to run in the $-X$ direction so that the each data on the tracks $T_7$, $T_{19}$, $T_{31}$ and $T_{43}$ is reproduced by the reproducing heads $R_2$, $R_4$, $R_6$ and $R_8$ respectively.

When data reproduction for one reciprocation has been completed, the combination head 21 is moved by the head operating unit to the relative position of the magnetic tape 23 at which the reproduction head $R_1$ corresponds to the track $T_2$, the reproduction head $R_3$ corresponds to the track $T_{14}$, the reproduction head $R_5$ corresponds to the track $T_{26}$ and the reproduction head $R_7$ corresponds to the track $T_{38}$. At this time, the head operating unit moves the combination head 21 so as to make the output $Ea_1$ from the light receiving device 25a and the output $Eb_1$ from the light receiving device 25b to hold the following relationship:

$$Eb_1 = 2Ea_1$$

When the magnetic tape 23 is allowed to run in the X direction, data on the tracks $T_2$, $T_{14}$, $T_{26}$ and $T_{38}$ is reproduced by the reproducing heads $R_1$, $R_3$, $R_5$ and $R_7$. Then, the magnetic tape 23 is allowed to run in the $-X$ direction so that each data on the tracks $T_8$, $T_{20}$, $T_{32}$ and $T_{44}$ is reproduced respectively. Then, the similar operation is repeated until the magnetic tape 23 is reciprocated 6 times so that data on all of the tracks $T_1$ to $T_{48}$ is reproduced. The above-described operation is similarly applied to the recording operation.

The head control unit 100a of the head operating unit 100 thus receives the end of reciprocation signals on line 104 in an expected sequence according to the serpentine track traversal pattern. Upon receiving an end of reciprocation signal, the head control unit 100a selects the light receiving output elements whose output signals are to be set in a known predetermined relation for the next reciprocation. In conventional feedback manner, the head control unit 100a of the head operating unit 100 receives on lines 102a and 102b the output signals from the light receiving elements, and applies the necessary corrective feedback signal on line 106 to the head moving unit in order to ensure that the signals are in the required predetermined relation.

In general, the output from the light receiving device such as a photo-diode and that from the light emitting unit such as a light emitting diode can be easily changed due to the influence of the ambient temperature. However, the tracking control device according to this embodiment is structured such that the output $Eb_1$ from the light receiving device 25b for detecting the relative position is an integer multiple of the output $Ea_1$ from the reference-outputting light receiving device 25a at each of the relative positions between the magnetic tape 23 and the combination head 21. Therefore, the position control can be stably controlled without an influence of temperature.

The positions of the light receiving devices 25a and 25b are not limited to the above-described description in which they are disposed at the $-Y$ directional end of the magnetic tape 23. Another structure may be employed in which they are disposed at the $+Y$ directional end of the magnetic tape 23. In this case, the area of appearance of the light receiving surface of the light receiving device 25b is decreased in accordance with the movement of the combination head 21 in the direction $-Y$. This structure may also be applied to the following embodiments.

A second embodiment of the present invention will be described with reference to FIGS. 4 and 5. The elements having the same functions as those shown in the aforesaid embodiment are given the same reference numerals and their descriptions are omitted.

Figure 5A:
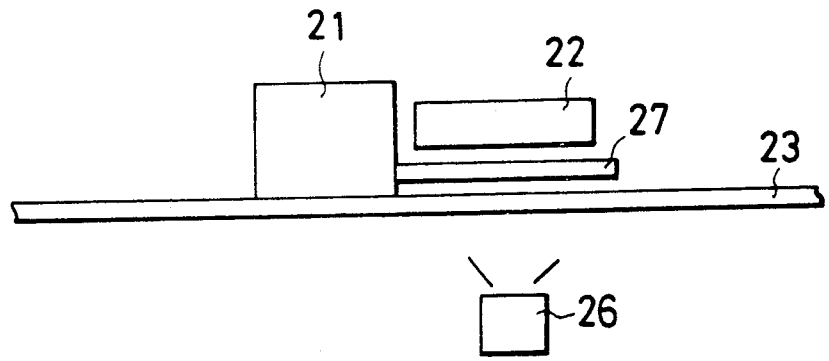
FIG. 5a is a schematic plan view which illustrates the relative positions among the magnetic tape, the combination head, a light-receiving device and a slit plate.
Figure 5B:
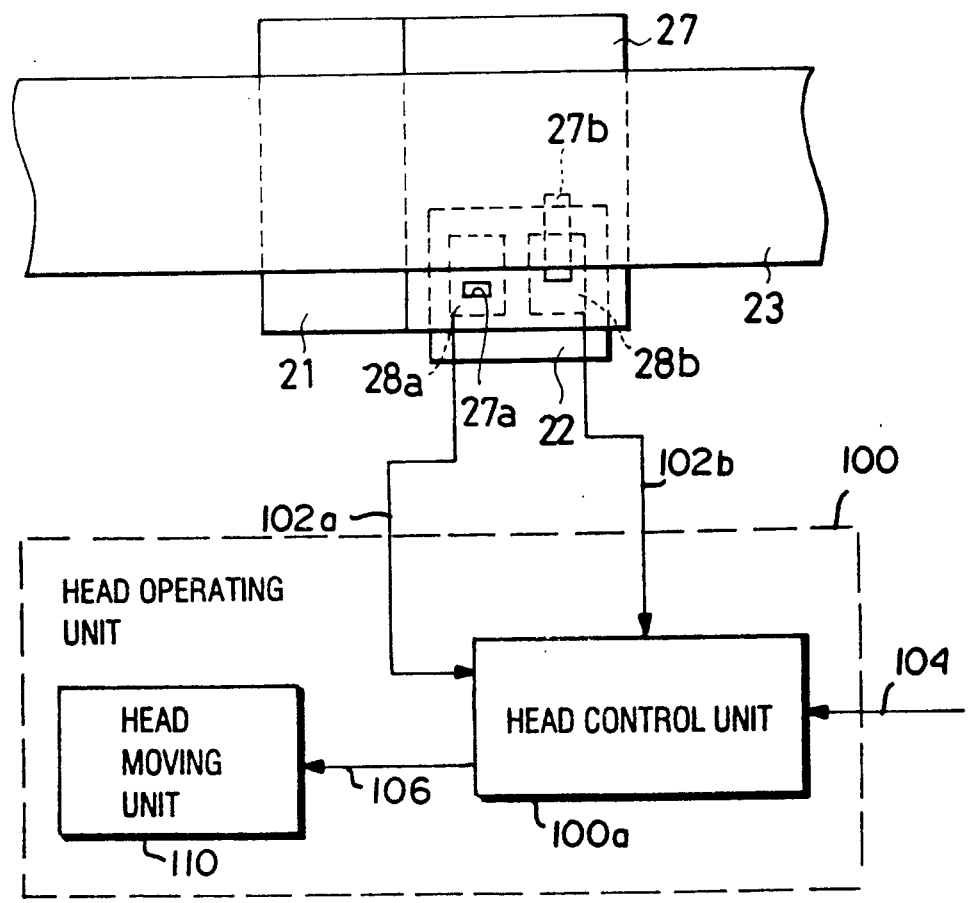
FIG. 5b is a front elevational view which illustrates the relative positions among the magnetic tape, the combination head, a light-receiving device and a slit plate.

As shown in FIGS. 4, 5a and 5b, the magnetic recording/reproducing apparatus according to this embodiment includes a combination head 21 for recording/reproducing data from the magnetic tape 23, the combination head 21 having a slit plate 27 integrally formed with the combination head 21. The structure of the magnetic tape 23 and that of the combination head 21 can be the same as those according to the first embodiment.

A light-receiving device holding member 22 is secured to the slit plate 27 on the side opposite to the side confronting the magnetic tape 23, the light-receiving device holding member 22 being formed independently from the combination head 21 and the slit plate 27. The light-receiving device holding member 22 has a reference-outputting light receiving device 28a serving as the first light receiving device and a light receiving device 28b for detecting the relative position and serving as the second light receiving device at a position corresponding to the −Y directional end of the magnetic tape 23, the light receiving devices 28a and 28b being disposed in the direction X. The large portion of the light receiving surface of the light receiving device 28a and that of 28b are positioned in the direction −Y by larger degrees than the −Y directional end of the magnetic tape 23. The light receiving surface of the light receiving device 28a and that of 28b are arranged such that the X directional width $l_H$ is larger than the X directional width f of a reference opening 27a and that of an opening 27b for detecting the relative position. On the other hand, the Y directional width $l_y$ is larger than the Y directional width $e_2$ of an opening 27b for detecting the relative position. The output levels for a unit area of the two light receiving devices 28a and 28b are arranged to be the same. The above-described slit plate 27 has the reference opening 27a serving as the first opening and an opening 27b for detecting the relative position and serving as the second opening. The reference opening 27a is arranged such that its Y directional opening width e1 is 120 μm which is the same width as that of the tracks $T_1$ to $T_{48}$ while its X directional opening width is f with which a sufficient output level can be obtained. The opening 27b for detecting the relative position is formed near the reference opening 27a and it has the X directional width of f and whose Y directional width $e_2$ has a proper value holding the relationship $e_2 \geq 720$ μm. The reference opening 27a is positioned such that it is not concealed by the magnetic tape 23. Furthermore, when the reference opening 27a moved in the direction Y in accordance with the movement of the combination head 21 in the direction Y, it is arranged so as to exist within the light receiving surface of the light receiving device 28a for all of the movement range of the reference opening 27a. The opening 27b for detecting the relative positions is provided such that it −Y directional end appears from the −Y directional end of the magnetic tape 23 when the recording head $W_1$ and the reproducing head $R_1$ are at the track position $T_1$. Furthermore, it is structured such that its opening area appearing from the magnetic tape 23 becomes enlarged and the appearance area of the light receiving surface of the light receiving device 28a is increased in accordance with the movement of the combination head 21 in the direction −Y and the appearance area of the light receiving surface of the light receiving device 28a is increased. When the combination head 21 moved to each of the relative positions with respect the magnetic tape 23, output $Ea_2$ from the light receiving device 28a due to light which passed through the reference opening 27a and output $Eb_2$ from the light receiving device 28b due to light which passed through the opening 27b for detecting the relative position have the following relationship:

$Eb_2 = m \times Ea_2$ ($1 \leq m$, where m represents a positive integer)

The above-described numeral m represents the each of the relative positions between, for example, the reproducing head $R_1$ of the combination head 21 and the plurality of tracks $T_1$ to $T_6$ positioned in a range in which the reproducing head $R_1$ can move, the numeral m can be a different value in accordance with each of the relative positions. That is, according to this embodiment, when the recording head $W_1$ moved to, for example, the positions of the tracks $T_1$, $T_2$, $T_3$, $T_4$, $T_5$ and $T_6$, the each of the following relationships is established:

$Eb_2 = Ea_2$, $Eb_2 = 2Ea_2$, $Eb_2 = 3Ea_2$, $Eb_2 = 4Ea_2$, $Eb_2 = 5Ea_2$ and $Eb_2 = 6Ea_2$.

The light receiving devices 28a and 28b are connected to head operating unit 100. The head operating unit feedback-controls the combination head 21 in the ±Y directions so as to make the outputs $Ea_2$ and $Eb_2$ from the light receiving devices 28a and 28b hold the relationship $Eb_2 = m \times Ea_2$. As a result, the relative positions between the magnetic tape 23 and the combination head 21 are held at a predetermined positions as described above.

In the above regard, as shown in FIG. 5b, the head operating unit 100 includes a head control unit 100a and a head moving unit 110. The head control unit 100a is connected to receive output signals from the devices 28a and 28b on lines 102a and 102b, respectively. As understood from the ensuing discussion, the head control unit 100a also receives an "end of reciprocation" signal on line 104. Further, the head control unit 100a applies a control signal on line 106 to the head moving unit 110. The head moving unit 110 is described in more detail in connection with FIGS. 14 and 15.

As shown in FIGS. 5a, 5b, the light emitting unit 26 is disposed in a portion confronting the reference opening 27a and the opening 27b for detecting the relative position in the slit plate 27 with the −Y directional end of the magnetic tape 23 disposed therebetween.

When all of the tracks $T_1$ to $T_{48}$ including the tracks $T_1$, $T_{13}$, $T_{25}$, and $T_{37}$ are subjected to the data reproduction operation of the magnetic recording/reproducing apparatus structured as described above, the combination head 21 is operated by the head operating unit so that the reproducing head $R_1$ and the track $T_1$, the reproducing head $R_3$ and the track $T_{13}$, the reproducing head $R_5$ and the track $T_{25}$ and the reproducing head $R_7$ and the track $T_{37}$ are moved to the corresponding relative positions with respect to the magnetic tape 23. At this time, the head operating unit moves the combination head 21 so as to make the output $Ea_2$ from the light receiving device 28a and the output $Eb_2$ from the light receiving device 28b hold the following relationship:

$Eb_2 = Ea_2$

Furthermore, the head operating unit make the combination head 21 follow the weaving of the magnetic tape 23 so that the relative positions between the magnetic tape 23 and the combination head 21 are maintained. In this case, when the magnetic tape 23 is allowed to run in the X direction, the data on the tracks $T_1$, $T_{13}$, $T_{25}$ and $T_{37}$ are reproduced. On the other hand, when the magnetic tape 23 is allowed to run in the X direction, the data on the tracks $T_7$, $T_{19}$, $T_{31}$ and $T_{43}$ are reproduced.

When data reproduction for one reciprocation has been completed, the head operating unit feedback-controls to move the combination head 21 so as to make the output $Ea_2$ from the light receiving device 28a and the output $Eb_2$ from the light receiving device 28 establish the following relationship:

$Eb_2 = 2\ Ea_2$

When the magnetic tape 23 is allowed to run in the X direction, each data on the tracks $T_2$, $T_{14}$, $T_{26}$ and $T_{38}$ is reproduced respectively. Then, the magnetic tape 23 is allowed to run in the −X direction so that each data on the tracks $T_8$, $T_{20}$, $T_{32}$ and $T_{44}$ is reproduced respectively. Then, the similar operation is repeated so that data on all of the tracks $T_1$ to $T_{48}$ is reproduced. The above-described operation is similarly applied to the recording operation.

The head control unit 100a of the head operating unit 100 thus receives the end of reciprocation signals on line 104 in an expected sequence according to the serpentine track traversal pattern. Upon receiving an end of reciprocation signal, the head control unit 100a selects the light receiving output elements whose output signals are to be set in a known predetermined relation for the next reciprocation. In conventional feedback manner, the head control unit 100a of the head operating unit 100 receives on lines 102a and 102b the output signals from the light receiving elements, and applies the necessary corrective feedback signal on line 106 to the head moving unit in order to ensure that the signals are in the required predetermined relation.

According to this embodiment, the control is performed such that the quantity of light made incident upon the light receiving devices 28a and 28b after it passed through the $-Y$ directional end of the magnetic tape 23, the reference opening 27a and the opening 27b for detecting the relative position is detected and the output $Eb_2$ from the light receiving device 28b becomes an integer multiple of the output $Ea_2$ from the light receiving device 28a. Therefore, the tracking control similar to the first embodiment can be performed. According to this embodiment, since the structure is arranged such that the slit plate 27 is moved together with the combination head 21, the weight of the movable portion can be reduced in comparison to the first embodiment.

Similarly to the first embodiment, the position control can be stably controlled without an influence of temperature.

Next, a third embodiment of the tracking control device of a magnetic recording/reproducing apparatus according to the present invention will be described with reference to FIGS. 6 and 7.

Figure 7A:
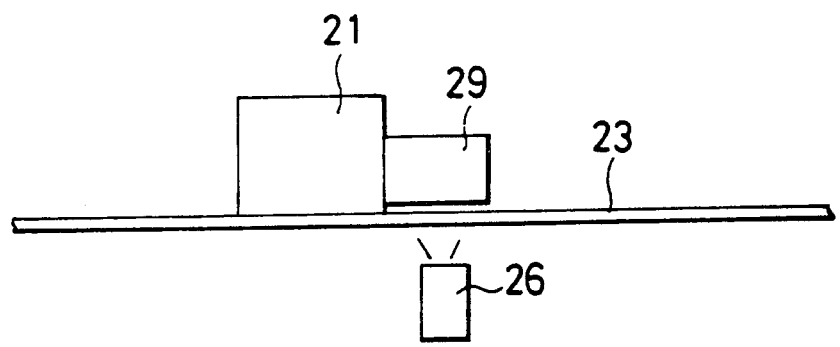
FIG. 7a is a schematic plan view which illustrates the relative positions among the magnetic tape, the combination head and the light-receiving device.
Figure 7B:
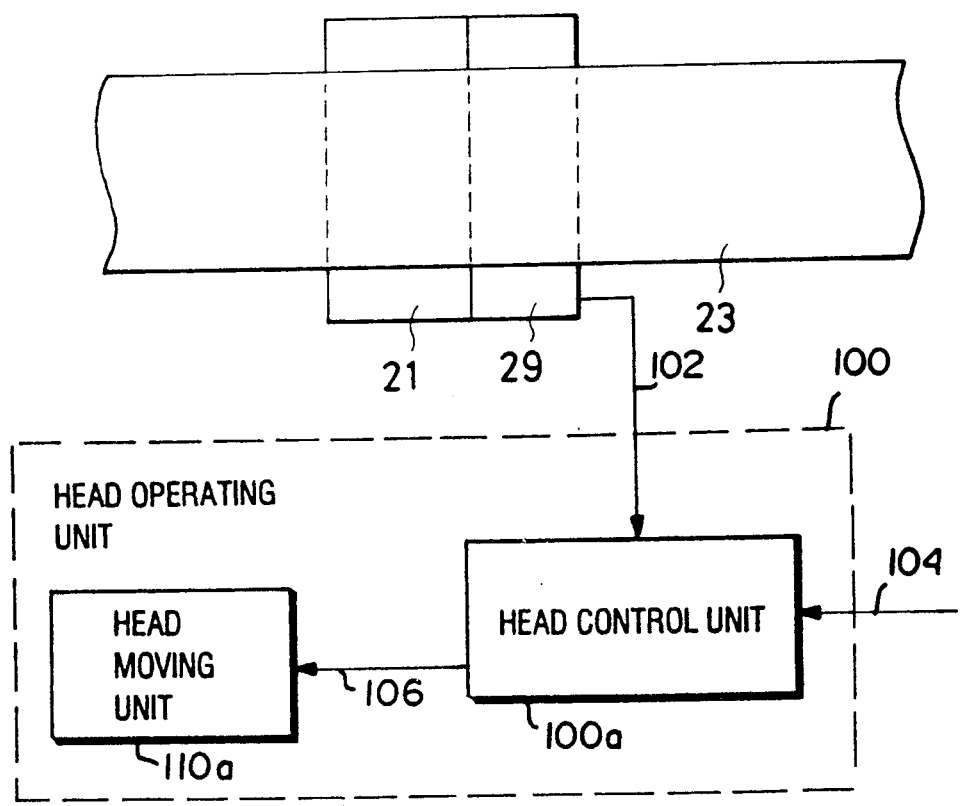
FIG. 7b is a front elevational view which illustrates the relative positions among the magnetic tape, the combination head and the light-receiving device.

As shown in FIGS. 6, 7a and 7b, the magnetic recording/reproducing apparatus includes a combination head 21 for recording/reproducing data from a magnetic tape 23, the combination head 21 having a light-receiving device holding member 29 formed integrally with the combination head 21.

The above-described magnetic tape 23 has the track group 24 constituted by the 48 tracks $T_1$ to $T_{48}$ formed in the Y direction at the same pitch as shown in FIG. 6. According to this embodiment, width C of the magnetic tape 23 is arranged to be ¼ inch and the track pitch is arranged to be 120 μm.

The combination head 21 includes 8 recording heads $W_1$ to $W_8$ and reproducing heads $R_1$ to $R_8$ which are integrally formed with the combination head 21. The recording heads $W_1$ to $W_8$ are disposed in the Y direction at a pitch of 720 μm, while the reproducing heads $R_1$ to $R_8$ are disposed in the X or $-X$ direction with forming pairs with the corresponding recording heads $W_1$ to $W_8$. The recording heads $W_1$ to $W_8$ and the reproducing heads $R_1$ to $R_8$ which form pairs are alternately disposed in the Y direction. When the magnetic tape 23 is allowed to run in the X direction, the four recording heads $W_1$, $W_3$, $W_5$ and $W_7$ of the combination head 21 perform the recording, while the magnetic tape 23 is allowed to run in the $-X$ direction, the four recording heads $W_2$, $W_4$, $W_6$ and $W_8$ perform the recording. Furthermore, whenever the magnetic tape 23 reciprocates once, the combination head 21 is moved in the $-Y$ direction so that the combination head 21 is positioned at 6 relative positions with respect to the magnetic tape 23. As a result, all of the 48 tracks $T_1$ to $T_{48}$ are subjected to the data recording/reproducing. Furthermore, the light-receiving device holding member 29 has light receiving device group 30 consisting of five light receiving devices $Da_1$ to $Da_5$ at positions corresponding to the $-Y$ directional end portion of the magnetic tape 23. The light receiving devices Da1 to Da5 are arranged to have the same output level and to be moved in accordance with the movement of the combination head 21 in the $\pm Y$ directions since the light-receiving device holding member 29 is integrally formed with the combination head 21. The light receiving surface of each of the light receiving devices Da1 to Da5 is arranged such that its X directional width is f with which a sufficient output level can be obtained. The light receiving device $Da_1$ is positioned at the largest degree in the $-Y$ direction. The light receiving devices $Da_2$ to $Da_4$ are respectively positioned such that their $-Y$ directional ends are successively shifted by 120 μm in the $+Y$ direction which corresponds to the width of the each of the tracks $T_1$ to $T_{48}$. The light receiving device $Da_5$ is positioned from the $-Y$ directional end by 240 μm in the $+Y$ direction. That is, pitch $d_1$ between the light receiving devices $Da_1$ and $Da_2$, pitch $d_2$ between the light receiving devices $Da_2$ and $Da_3$ and pitch $d_3$ between the light receiving devices $Da_3$ and $Da_4$ are respectively arranged to be 120 μm. On the other hand, pitch $d_4$ between the light receiving devices $Da_4$ and $Da_5$ is arranged to be 240 μm. The relationship among the light receiving devices $Da_1$ to $Da_5$ and the pitches $d_1$ to $d_5$ are arranged as follows assuming that the i-th pitch in the $+Y$ direction is di and the width of each of the tracks $T_1$ to $T_{48}$ is d:

$di = d$ when $i \leq 2$ $di = (i-2) \times d$ when $3 \leq i \leq n-1$ (where i and n respectively represent positive integers)

According to this embodiment, the structure is arranged such that when, for example, the recording head $W_1$ and the reproducing head $R_1$ of the combination head 21 are at the track position $T_1$, the light receiving device $Da_1$ is positioned at which it appears by 3d from the $-Y$ directional end of the magnetic tape 23. According to this embodiment, when the recording head $W_1$ is moved to, for example, the positions of the tracks $T_1$, $T_2$, $T_3$, $T_4$, $T_5$ and $T_6$, the following relationships among the outputs $Ea_1$ to $Ea_5$ from the light receiving devices $Da_1$ to $Da_5$ are established $Ea_3 = Ea_1 - Ea_2$, $Ea_4 = Ea_1 - Ea_2$, $Ea_4 = Ea_1 - Ea_3$, $Ea_5 = Ea_1 - Ea_2$, $Ea_5 = Ea_1 - Ea_3$, $Ea_5 = Ea_1 - Ea_4$.

The light receiving devices $Da_1$ to $Da_5$ are connected to head operating unit 100. The head operating unit feedback-controls the combination head 21 in the $\pm Y$ directions so as to make the outputs $Ea_1$ and $Ea_5$ from the light receiving devices $Da_1$ to $Da_5$ to hold the above-described relationship when the combination head 21 moved to the relative positions among the recording heads $W_1$ to $W_8$, the reproducing heads $R_1$ to $R_8$ and the tracks $T_1$ to $T_{48}$. As a result, the relative positions between the magnetic tape 23 and the combination head 21 are held at predetermined positions as described above.

In the above regard, as shown in FIG. 7b, the head operating unit 100 includes a head control unit 100a and a head moving unit 110. The head control unit 100a is connected to receive output signals from the devices $Da_1$-$Da_5$ on lines 102. As understood from the ensuing discussion, the head control unit 100a also receives an "end of reciprocation" signal on line 104. Further, the head control unit 100a applies a control signal on line 106 to the head moving unit 110. The head moving unit 110 is described in more detail in connection with FIGS. 14 and 15.

As shown in FIGS. 7a, 7b, light emitting unit 26 capable of emitting light of a sufficient quantity to the light receiving devices $Da_1$ to $Da_5$ is disposed in a portion confronting the light receiving devices $Da_1$ to $Da_5$ with the $-Y$ directional end of the magnetic tape 23 disposed therebetween.

When all of the tracks $T_1$ to $T_{48}$ including the tracks $T_1$, $T_{13}$, $T_{25}$, and $T_{37}$ are subjected to the data reproduction operation of the magnetic recording/reproducing apparatus structured as described above, the combination head 21 is operated by the head operating unit so that the reproducing head $R_1$ and the track $T_1$, the reproducing head $R_3$ and the track $T_{13}$, the reproducing head $R_5$ and the track $T_{25}$ and the reproducing head $R_7$ and the track $T_{37}$ are moved to the corresponding relative positions with respect to the magnetic tape 23. At this time, the head operating unit moves the combination head 21 so as to make the output $Ea_1$ from the light receiving device $Da_1$ and the output $Ea_2$ from the light receiving device $Da_2$ hold the following relationship by the feedback control:

$$Ea_3 = Ea_1 - Ea_2$$

Furthermore, the head operating unit make the combination head 21 follow the weaving of the magnetic tape 23 so that the relative positions between the magnetic tape 23 and the combination head 21 are maintained. Therefore, the relative position between the combination head 21 and the magnetic tape 23 can be held correctly. In this case, when the magnetic tape 23 is allowed to run in the direction X, the data on the tracks $T_1$, $T_{13}$, $T_{25}$ and $T_{37}$ are reproduced by the reproducing heads $R_1$, $R_3$, $R_5$ and $R_7$. When the reproduction to the end portion of the magnetic tape 23 has been completed, the magnetic tape 23 is allowed to run in the direction $-X$ so that the data on the tracks $T_7$, $T_{19}$, $T_{31}$ and $T_{43}$ is reproduced by the reproducing heads $R_2$, $R_4$, $R_6$ and $R_8$.

When data reproduction for one reciprocation has been completed, the combination head 21 is moved by the head operating unit to the relative position of the magnetic tape 23 at which the reproduction head $R_1$ corresponds to the track $T_2$, the reproduction head $R_3$ corresponds to the track $T_{14}$, the reproduction head $R_5$ corresponds to the track $T_{26}$ and the reproduction head $R_7$ corresponds to the track $T_{38}$. At this time, the head operating unit moves the combination head 21 so as to make the output $Ea_1$ from the light receiving device $Da_1$ and the output $Ea_2$ from the light receiving device $Da_2$ and the output $Ea_4$ from the light receiving device $Da_4$ establish the following relationship by the feedback control:

$$Ea_4 = Ea_1 - Ea_2$$

When the magnetic tape 23 is allowed to run in the direction X in this state, data on the tracks $T_2$, $T_{14}$, $T_{26}$ and $T_{38}$ is reproduced by the reproducing heads R1, R3, R5 and R7. Then, the magnetic tape 23 is allowed to run in the direction $-X$ so that data on the tracks $T_8$, $T_{20}$, $T_{32}$ and $T_{44}$ is reproduced.

Similarly, the combination head 21 is moved after the one reciprocation at each of the track positions so as to hold the following relationships: when data on tracks $T_3$, $T_{15}$, $T_{27}$, $T_{39}$ and tracks $T_9$, $T_{21}$, $T_{33}$, $T_{44}$ are reproduced $$Ea_4 = Ea_1 - Ea_3$$

when data on tracks $T_4$, $T_{16}$, $T_{28}$, $T_{40}$ and the tracks $T_{10}$, $T_{22}$, $T_{34}$, $T_{46}$ are reproduced $$Ea_5 = Ea_1 - Ea_2$$

when data on tracks $T_5$, $T_{17}$, $T_{29}$, $T_{41}$ and tracks $T_{11}$, $T_{23}$, $T_{35}$, $T_{47}$ are reproduced $$Ea_5 = Ea_1 - Ea_3$$

when data on tracks $T_6$, $T_{18}$, $T_{30}$, $T_{42}$ and tracks $T_{12}$, $T_{24}$, $T_{36}$, $T_{48}$ are reproduced $$Ea_5 = Ea_1 - Ea_4$$

As a result, the track switching operation and the track followup operation are executed so that the data on all of the tracks $T_1$ to $T_{48}$ are reproduced. The above-described operation is applied to the data recording operation.

The head control unit 100a of the head operating unit 100 thus receives the end of reciprocation signals on line 104 in an expected sequence according to the serpentine track traversal pattern. Upon receiving an end of reciprocation signal, the head control unit 100a selects the light receiving output elements whose output signals are to be set in a known predetermined relation for the next reciprocation. In conventional feedback manner, the head control unit 100a of the head operating unit 100 receives on lines 102 the output signals from the light receiving elements, and applies the necessary corrective feedback signal on line 106 to the head moving unit in order to ensure that the signals are in the required predetermined relation.

According to this embodiment, since the structure is arranged such that the difference in output between two predetermined light receiving devices becomes the same as the output from a predetermined light receiving device, the position control can be stably obtained without an influence of temperature.

According to this embodiment, the numbers of the relative positions between the magnetic tape 23 and the combination head 21 are arranged to be six. The number of the light receiving devices for detecting a plurality of relative positions can be reduced by increasing the number of the relative positions.

The positions of the light receiving devices $Da_1$ to $Da_5$ are not limited to the above-described structure in which they are positioned at the $-Y$ directional end of the magnetic tape 23. A structure may be employed in which they are positioned at the $+Y$ directional end of the magnetic tape 23 and the appearance area of the light receiving surface of each of the light receiving devices $Da_1$ to $Da_5$ decreases in accordance with the movement of the combination head 21 in the $-Y$ direction. The above-described structure may be applied to the following embodiments.

Next, a fourth embodiment of the present invention will be described with reference to FIGS. 8 and 9. In order to make the description easier, the elements having the same function as those in the above-described embodiments are given the same reference numerals and their descriptions are omitted.

Figure 8:
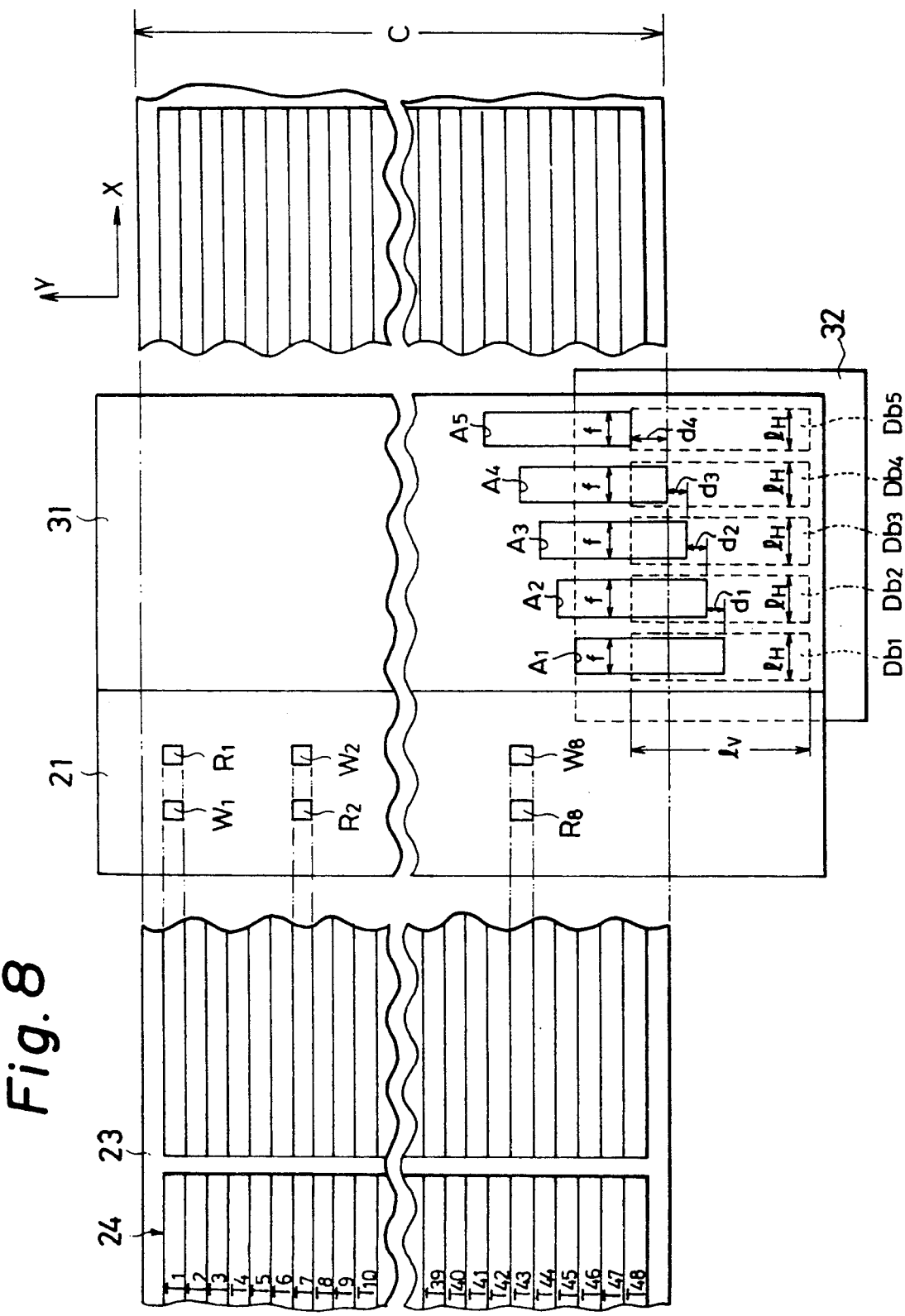
FIG. 8 is a front elevational view which illustrates the relative positions among the magnetic tape, the combination head, the light receiving device and openings formed in the slit plate.
Figure 9A:
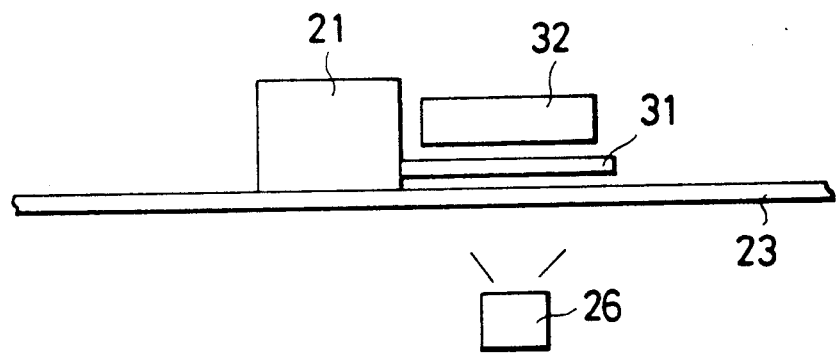
FIG. 9a is a schematic plan view which illustrates the relative positions among the magnetic tape, the combination head, the light-receiving device holding member and the slit plate.
Figure 9B:
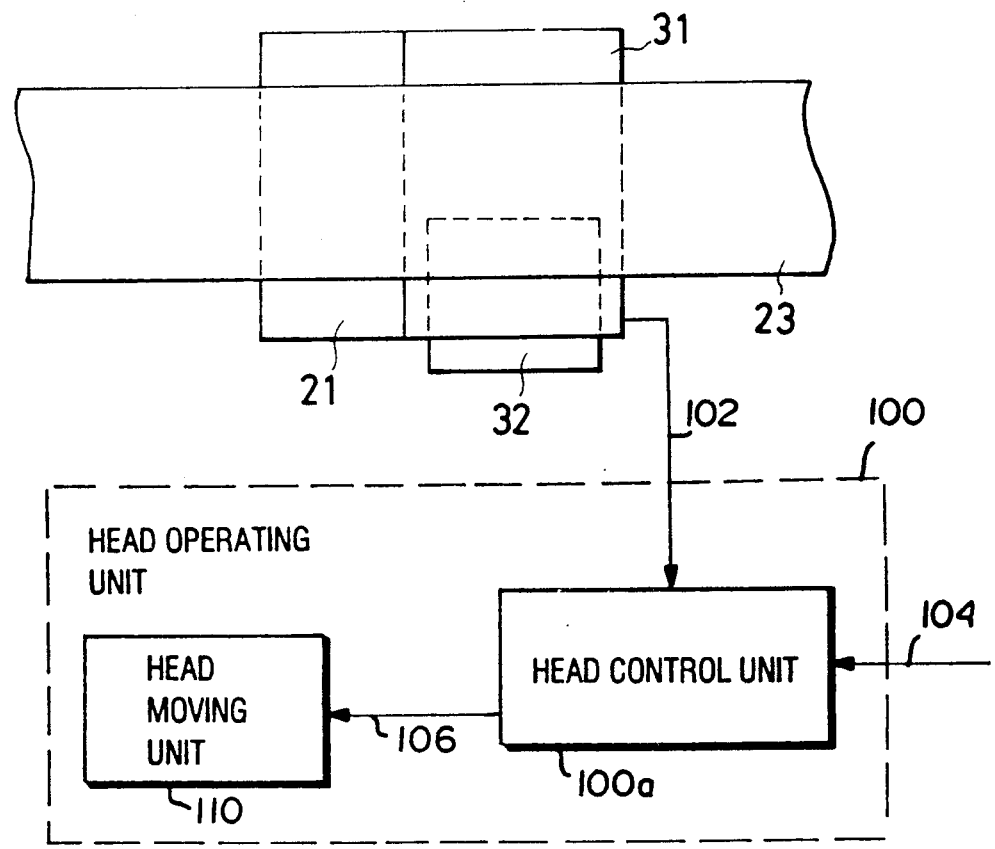
FIG. 9b is a front elevational view which illustrates the relative positions among the magnetic tape, the combination head, the light-receiving device holding member and the slit plate.

As shown in FIGS. 8, 9a and 9b, the magnetic recording/reproducing apparatus according to this embodiment includes a combination head 21 for recording/reproducing data from the magnetic tape 23, the combination head 21 having a slit plate 31 integrally formed with the combination head 21. The structure of the magnetic tape 23 and that of the combination head 21 are arranged to be the same as those according to the third embodiment.

A light-receiving device holding member 32 is secured to the slit plate 31 on the side opposite to the side confronting the magnetic tape 23, the light-receiving device holding member 32 being formed independently from the combination head 21 and the slit plate 31. The light-receiving device holding member 32 has five light receiving devices $Db_1$ to $Db_5$ at a positions corresponding to the $-Y$ directional end of the magnetic tape 23, the light receiving devices $Db_1$ to $Db_5$ being disposed in the X direction. The light receiving devices $Db_1$ to $Db_5$ are arranged to independently receive light which passes through the $-Y$ directional end of the magnetic tape 23 and openings $A_1$ to $A_5$ to be described later. The light receiving surface of each of the light receiving devices $Db_1$ to $Db_5$ is arranged to be elongated in the Y direction, and the large portion of the light receiving surface of them are positioned in the $-Y$ direction by larger degrees than the $-Y$ directional end of the magnetic tape 23. The light receiving surface of each of light receiving devices $Db_1$ to $Db_5$ are arranged such that the X directional width $l_H$ is larger than the X directional width f of each of openings $A_1$ to $A_5$. Furthermore, the Y-directional width $l_y$ is arranged to be a value which corresponds to the Y-directional movement of the openings $A_1$ to $A_5$. The output levels for a unit area of the light receiving devices $Db_1$ to $Db_5$ are arranged to be the same.

The above-described slit plate 31 has the openings $A_1$ to $A_5$. The openings $A_1$ to $A_5$ are arranged such that its Y directional opening width is f with which a sufficient output level can be obtained from the light receiving devices $Db_1$ to $Db_5$. The opening $A_1$ is positioned at the largest degree in the $-Y$ direction. The openings $A_2$ to $A_4$ are respectively positioned such that their $-Y$ directional ends are successively shifted by 120 μm in the $+Y$ direction which corresponds to the width of the each of the tracks $T_1$ to $T_{48}$ from the $-Y$ directional end of the opening $A_1$. The opening $A_5$ is positioned from the $-Y$ directional end by 240 μm in the $+Y$ direction. That is, pitch $d_1$ between the opening $A_1$ and $Db_2$, pitch $d_2$ between the opening $A_2$ and $Db_3$ and pitch $d_3$ between the opening $A_3$ and $Da_4$ are respectively arranged to be 120 μm. On the other hand, pitch $d_4$ between the openings $A_4$ and $A_5$ is arranged to be 240 μm. The relationship among the opening $A_1$ to $A_5$ and the pitches $d_1$ to $d_5$ are arranged as follows assuming that the i-th pitch in the $+Y$ direction is $d_i$ and the width of each of the tracks $T_1$ to $T_{48}$ is d:

$d_i = d$ when $i \leq 2$ $d_i = (i-2) \times d$ when $3 \leq i \leq n-1$ (where i and n respectively represent positive integers)

According to this embodiment, the structure is arranged such that when, for example, the recording head $W_1$ and the reproducing head $R_1$ of the combination head 21 are at the track position $T_1$, the opening $A_1$ is positioned at which it appears by $3d$ from the $-Y$ directional end of the magnetic tape 23. According to this embodiment, when the recording head $W_1$ is moved to, for example, the positions of the tracks $T_1$, $T_2$, $T_3$, $T_4$, $T_5$ and $T_6$, the following relationships among the outputs $Eb_1$ to $Eb_5$ from the light receiving devices $Db_1$ to $Db_5$ due to light which passed through the openings $A_1$ to $A_5$ and the $-Y$ directional end of the magnetic tape 23 are established: $Eb_3 = Eb_1 - Eb_2$, $Eb_4 = Eb_1 - Eb_2$, $Eb_4 = Eb_1 - Eb_3$, $Eb_5 = Eb_1 - Eb_2$, $Eb_5 = Eb_1 - Eb_3$, $Eb_5 = Eb_1 - Eb_4$.

The light receiving devices $Db_1$ to $Db_5$ are connected to head operating unit 100. The head operating unit feedback-controls the combination head 21 in the $\pm Y$ directions so as to make the outputs $Eb_1$ and $Eb_5$ from the light receiving devices $Db_1$ to $Db_5$ hold the above-described relationship when the combination head 21 is moved to the relative positions among the recording heads $W_1$ to $W_8$ and the reproducing heads $R_1$ to $R_8$ and the tracks $T_1$ to $T_{48}$. As a result, the relative positions between the magnetic tape 23 and the combination head 21 are held at predetermined positions as described above.

In the above regard, as shown in FIG. 9b, the head operating unit 100 includes a head control unit 100a and a head moving unit 110. The head control unit 100a is connected to receive output signals from the devices $Db1$ and $Db5$ on lines 102. As understood from the ensuing discussion, the head control unit 100a also receives an "end of reciprocation" signal on line 104. Further, the head control unit 100a applies a control signal on line 106 to the head moving unit 110. The head moving unit 110 is described in more detail in connection with FIGS. 14 and 15.

As shown in FIGS. 9a, 9b, light emitting unit 26 capable of emitting light of a sufficient quantity to the light receiving devices $Db_1$ to $Db_5$ is disposed in a portion confronting the light receiving devices $Db_1$ to $Db_5$ with the $-Y$ directional end of the magnetic tape 23 and the openings $A_1$ to $A_5$ formed in the slit plate 31 disposed therebetween.

When all of the tracks $T_1$ to $T_{48}$ including the tracks $T_1$, $T_{13}$, $T_{25}$, and $T_{37}$ are subjected to the data reproduction operation of the magnetic recording/reproducing apparatus structured as described above, the combination head 21 is operated by the head operating unit so that the reproducing head $R_1$ and the track $T_1$, the reproducing head $R_3$ and the track $T_{13}$, the reproducing head $R_5$ and the track $T_{25}$ and the reproducing head $R_7$ and the track $T_{37}$ are moved to the corresponding relative positions with respect to the magnetic tape 23. At this time, the head operating unit moves the combination head 21 so as to make the output $Eb_1$ from the light receiving device $Db_1$, the output $Eb_2$ from the light receiving device $Db_2$ and the output $Eb_3$ from the light receiving device $Db_3$ hold the following relationship by the feedback control:

$Eb_3 = Eb_1 - Eb_2$

Therefore, the head operating unit make the combination head 21 follow the weaving of the magnetic tape 23 so that the relative positions between the magnetic tape 23 and the combination head 21 are maintained. In this case, when the magnetic tape 23 is allowed to run in the X direction, the data on the tracks $T_1$, $T_{13}$, $T_{25}$ and $T_{37}$ are reproduced by the reproducing heads $R_1$, $R_3$, $R_5$ and $R_7$. When the magnetic tape 23 is allowed to run in the X direction, the data on the tracks $T_7$, $T_{19}$, $T_{31}$ and $T_{43}$ are reproduced by the reproducing heads $R_2$, $R_4$, $R_6$ and $R_8$.

Similarly, the combination head 21 is moved after the one reciprocation at each of the track positions so as to hold the following relationships: When data on the tracks $T_2$, $T_{14}$, $T_{26}$, $T_{38}$ and the tracks $T_8$, $T_{20}$, $T_{32}$, $T_{44}$ are reproduced, $$Eb_4 = Eb_1 - Eb_2$$

When data on tracks $T_3$, $T_{15}$, $T_{27}$, $T_{39}$ and tracks $T_9$, $T_{21}$, $T_{33}$, $T_{45}$ are reproduced, $$Eb_4 = Eb_1 - Eb_3$$

When data on tracks $T_4$, $T_{16}$, $T_{28}$, $T_{40}$ and the tracks $T_{10}$, $T_{22}$, $T_{34}$, $T_{46}$ are reproduced $$Eb_5 = Eb_1 - Eb_2$$

When data on tracks $T_5$, $T_{17}$, $T_{29}$, $T_{41}$ and tracks $T_{11}$, $T_{23}$, $T_{35}$, $T_{47}$ is reproduced $$Eb_5 = Eb_1 - Eb_3$$

When data on tracks $T_6$, $T_{18}$, $T_{30}$, $T_{42}$ and tracks $T_{12}$, $T_{24}$, $T_{36}$, $T_{48}$ is reproduced $$Eb_5 = Eb_1 - Eb_4$$

As a result, the track switching operation and the track followup operation are executed so that the data on all of the tracks $T_1$ to $T_{48}$ is reproduced. The above-described operation is applied to the data recording operation. As described above, since the structure according to this embodiment is arranged such that the slit plate 31 is moved together with the combination head 21, the weight of the movable portion can be reduced in comparison to the structure according to the third embodiment.

The head control unit 100a of the head operating unit 100 thus receives the end of reciprocation signals on line 104 in an expected sequence according to the serpentine track traversal pattern. Upon receiving an end of reciprocation signal, the head control unit 100a selects the light receiving output elements whose output signals are to be set in a known predetermined relation for the next reciprocation. In conventional feedback manner, the head control unit 100a of the head operating unit 100 receives on lines 102 the output signals from the light receiving elements, and applies the necessary corrective feedback signal on line 106 to the head moving unit in order to ensure that the signals are in the required predetermined relation.

Similarly to the first embodiment, a stable position control can be obtained without an influence of temperature.

Next a fifth embodiment of the tracking control device of a magnetic recording/reproducing apparatus will be described with reference to FIGS. 10 and 11.

Figure 10:
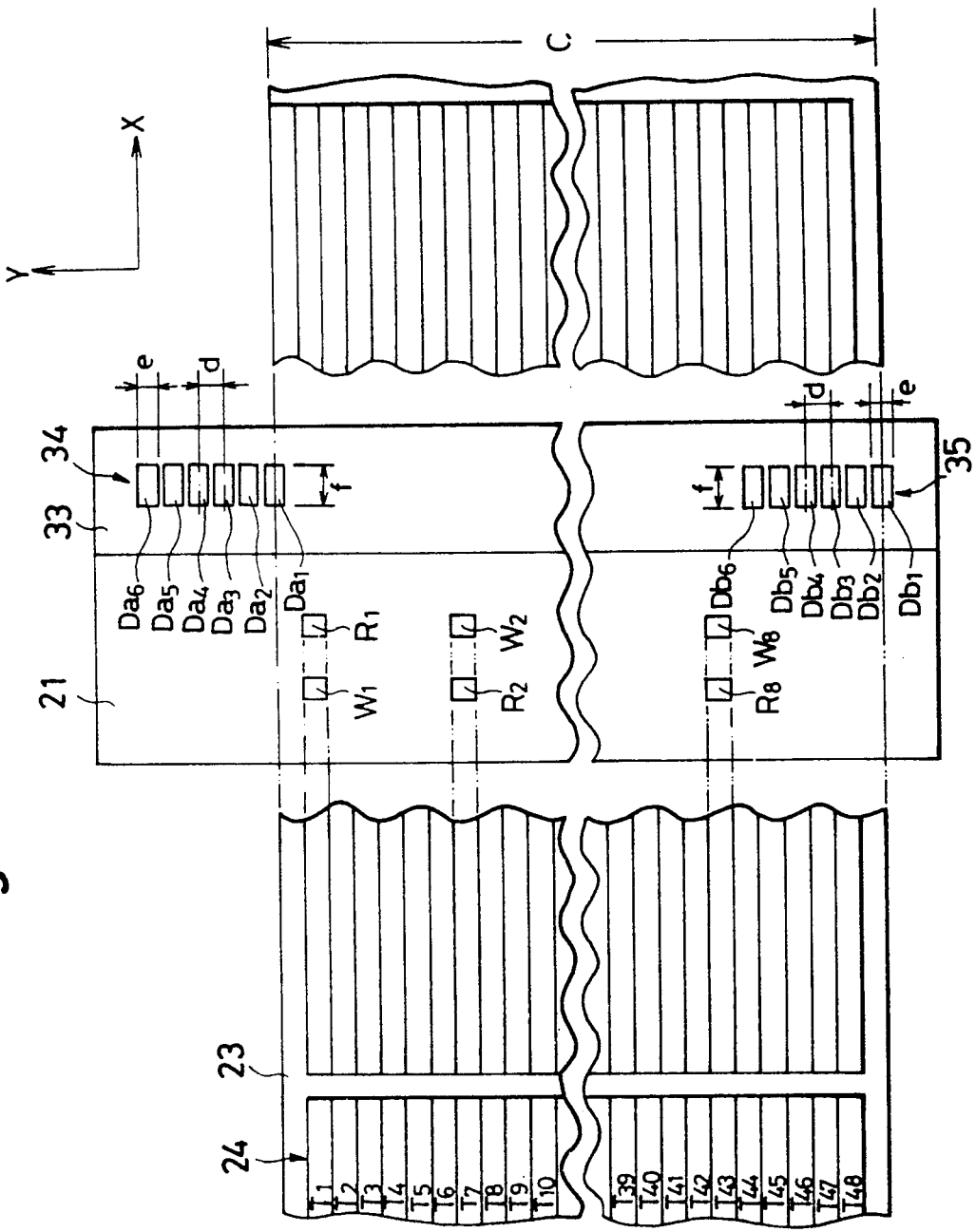
FIG. 10 is a front elevational view which illustrates the relative positions among the magnetic tape, the combination head and the light receiving device.
Figure 11A:
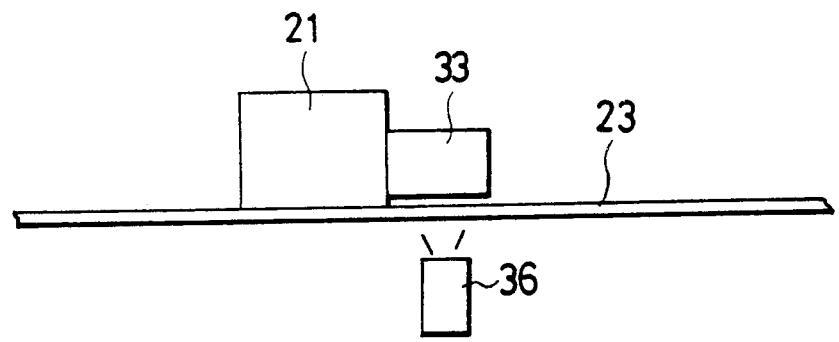
FIG. 11a is a schematic plan view which illustrates the relative positions among the magnetic tape, the combination head and the light-receiving device holding member.
Figure 11B:
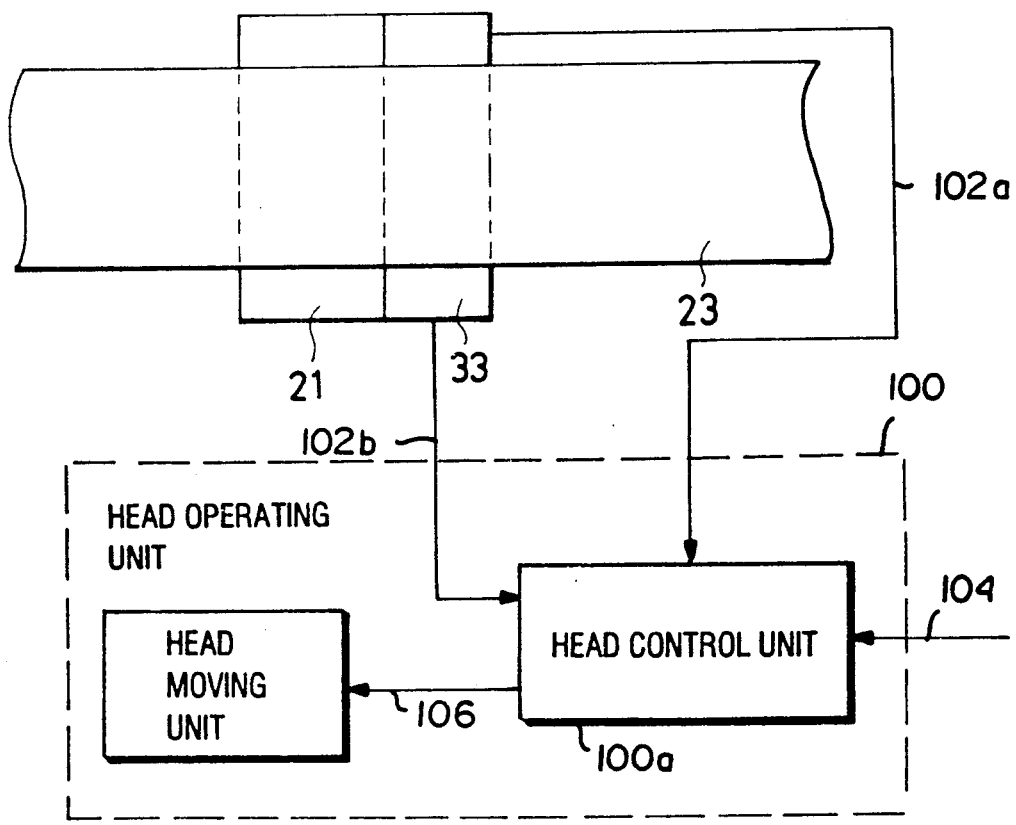
FIG. 11b is a front elevational view which illustrates the relative positions among the magnetic tape, the combination head and the light-receiving device holding member.

As shown in FIGS. 10, 11a and 11b, the magnetic recording/reproducing apparatus includes the combination head 21 for recording and reproducing data from the magnetic tape 23 and having a light-receiving device holding member 34 formed integrally with the combination head 21.

The above-described magnetic tape 23 has a track group 24 constituted by the 48 tracks $T_1$ to $T_{48}$ formed in the direction Y at the same pitch as shown in FIG. 10. According to this embodiment, width C of the magnetic tape 23 is arranged to be ¼ inch and the track pitch is arranged to be 120 μm. The weaving in the magnetic tape 23 is restricted to smaller than ±50 μm by flanges or the like (omitted from illustration) for ±Y directional end of the magnetic tape 23.

The combination head 21 includes 8 recording heads $W_1$ to $W_8$ and reproducing heads $R_1$ to $R_8$ which are recording heads $W_1$ to $W_8$ are disposed in the Y direction at a pitch of 720 μm, while the reproducing heads $R_1$ to $R_8$ are disposed in the X or $-X$ direction with forming pairs with the corresponding recording heads $W_1$ to $W_8$. The recording heads $W_1$ to $W_8$ and the reproducing heads $R_1$ to $R_8$ which form pairs are alternately disposed in the Y direction. When the magnetic tape 23 is allowed to run in the X direction, the four recording heads $W_1$, $W_3$, $W_5$ and $W_7$ of the combination head 21 perform the recording, while the magnetic tape 23 is allowed to run in the direction $-X$, the four recording heads $W_2$, $W_4$, $W_6$ and $W_8$ perform the recording. Furthermore, whenever the magnetic tape 23 reciprocates once, the combination head 21 is moved in the $-Y$ direction so that the combination head 21 is positioned at 6 relative positions with respect to the magnetic tape 23. As a result, all of the 48 tracks $T_1$ to $T_{48}$ are subjected to the data recording/reproducing. Furthermore, light receiving device group 34 serving as a light receiving device group on one end and consisting of six light receiving devices $Da_1$ to $Da_6$ is provided in a portion corresponding to the portion in the vicinity of the $+Y$ directional end of the magnetic tape 23. Similarly, light receiving device group 35 serving as a light receiving device group on another end and consisting of six light receiving devices $Db_1$ to $Db_6$ is provided in a portion corresponding to the portion in the vicinity of the $-Y$ directional end of the magnetic tape 23. The number of the light receiving devices of the light receiving device groups 34 and 35 is arranged to be six which is the same as the number of the tracks $T_1$ to $T_6$ in a range in which, for example, the recording head $W_1$ and the reproducing head $R_1$ of the combination head 21 can be moved. The light receiving devices $Da_1$ to $Da_6$ and $Db_1$ to $Db_6$ are arranged to have the same output level. Furthermore, the light-receiving device holding member 33 is integrally formed with the combination head 21. As a result, the light receiving devices $Da_1$ to $Da_6$ and $Db_1$ to $Db_6$ can be moved in accordance with the movement of the combination head 21 in the $\pm Y$ directions. The light receiving surface of each of the light receiving devices $Da_1$ to $Da_6$ and $Db_1$ to $Db_6$ is arranged to have the Y-directional width e which can correspond to the weaving of the magnetic tape 23. The X-directional width is arranged to be f with which a sufficient output can be obtained. According to this embodiment, the above-described width e is 100 μm. The light receiving devices $Da_1$ to $Da_6$ and $Db_1$ to $Db_6$ are arranged such that the light receiving devices $Da_1$ and $Db_1$ are disposed at the $-Y$ directional end and the light receiving devices $Da_2$ to $Da_6$ and $Db_2$ to $Db_6$ are formed in the $+Y$ direction to form a line at the same pitch d (d=120 μm) as the track pitch of the magnetic tape 23. The light receiving devices $Da_1$ and $Db_1$ are shifted by ¼ inch in the direction Y of the magnetic tape 23. Furthermore, when, for example, the recording head $W_1$ and the reproducing head $R_1$ of the combination head 21 is at the track position $T_1$, the center of the light receiving devices $Da_1$ and that of $Db_1$ coincide with the ±Y directional end of the magnetic tape 23.

The above-described light receiving devices $Da_1$ to $Da_6$ and $Db_1$ to $Db_6$ are connected to the head operating unit 100. The head operating unit feedback controls the combination head 21 so as to move it to each of the relative positions between the recording heads $W_1$ to $W_8$, the reproducing heads $R_1$ to $R_8$ and the tracks $T_1$ to $T_{48}$ such that the difference in the output from the corresponding light receiving devices becomes zero, the combination head 21 being moved in the ±Y direction. As a result, the relative position between the magnetic tape 23 and the combination head 21 can be held at a predetermined position.

In the above regard, as shown in FIG. 11b, the head operating unit 100 includes a head control unit 100a and a head moving unit 110. The head control unit 100a is connected to receive output signals from the devices $Da_1$ to $Da_6$ on lines 102a and output signals from the devices $Db_1$ to $Db_6$ on lines 102b. As understood from the ensuing discussion, the head control unit 100a also receives an "end of reciprocation" signal on line 104. Further, the head control unit 100a applies a control signal on line 106 to the head moving unit 110. The head moving unit 110 is described in more detail in connection with FIGS. 14 and 15.

As shown in FIGS. 11a, 11b, light emitting unit 36 capable of emitting a sufficient quantity of light to the light receiving devices 34 and 35 are disposed at positions corresponding to the light receiving device groups 34 and 35 with the ±Y directional end of the magnetic tape 23 disposed therebetween.

At this time, the head operating unit feedback controls the combination head 21 so as to move it such that the difference in the output between the light receiving device $Da_1$ and the light receiving device $Db_1$ becomes zero. Furthermore, the head operating units 100 makes the combination head 21 follow the weaving of the magnetic tape 23 so as to maintain the relative position between the magnetic tape 23 and the combination head 21.

When the reproduction of data for one reciprocation has been completed as indicated by a signal to the head operating unit on line 104, the combination head 21 is moved to the relative position with the magnetic tape 23 at which the reproducing head $R_1$ and the track $T_2$ corresponds to each other, the reproducing head $R_3$ and the track $T_{14}$ corresponds to each other, the reproducing head $R_5$ and the track $T_{26}$ corresponds to each other and the reproducing head $R_7$ and the track $T_{38}$ corresponds to each other. At this time, the head operating unit 100 feedback-controls the combination head 21 so as to move it such that the difference in the output between the light receiving device $Da_2$ and that of the light receiving device $Db_2$ becomes zero. When the magnetic tape 23 is allowed to run in the X direction, data on the tracks $T_2$, $T_{14}$, $T_{26}$ and $T_{38}$ is reproduced by the reproducing heads $R_1$, $R_3$, $R_5$ and $R_7$. Then, when the magnetic tape 23 is allowed to run in the direction −X so that the tracks $T_8$, $T_{20}$, $T_{32}$ and $T_{44}$ are subjected to the reproduction.

Similarly, when data on the tracks $T_3$, $T_{15}$, $T_{27}$ and $T_{39}$ and data on the tracks $T_9$, $T_{21}$, $T_{33}$ and $T_{45}$ is reproduced, the combination head 21 is moved so as to make the difference in the output between the light receiving devices $Da_3$ and $Db_3$ becomes zero. When data on the tracks $T_4$, $T_{16}$, $T_{28}$ and $T_{40}$ and data on the tracks $T_{10}$, $T_{22}$, $T_{34}$ and $T_{46}$ is reproduced, the difference in the output between the light receiving devices $Da_4$ and $Db_4$ is made zero. When data on the tracks $T_5$, $T_{17}$, $T_{29}$ and $T_{41}$ and data on the tracks $T_{11}$, $T_{23}$, $T_{35}$ and $T_{47}$ is reproduced, the difference in the output between the light receiving devices $Da_5$ and $Db_5$ is made zero. When data on the tracks $T_6$, $T_{18}$, $T_{30}$ and $T_{42}$ and data on the tracks $T_{12}$, $T_{24}$, $T_{36}$ and $T_{48}$ is reproduced, the difference in the output between the light receiving devices $Da_6$ and $Db_6$ is made zero. The combination head 21 is moved after one reciprocation at each of the track position has been completed. Thus, the track switching operation and the track following-up operation are executed until data on all of the tracks $T_1$ to $T_{48}$ is reproduced. The above-described operation is applied to the recording operation.

The head control unit 100a of the head operating unit 100 thus receives the end of reciprocation signals on line 104 in an expected sequence according to the serpentine track traversal pattern. Upon receiving an end of reciprocation signal, the head control unit 100a selects the light receiving output elements whose output signals are to be set in a known predetermined relation for the next reciprocation. In conventional feedback manner, the head control unit 100a of the head operating unit 100 receives on lines 102a and 102b the output signals from the light receiving elements, and applies the necessary corrective feedback signal on line 106 to the head moving unit in order to ensure that the signals are in the required predetermined relation.

Next, a sixth embodiment of the present invention will be described with reference to FIGS. 12 and 13. In order to make the description easy, the elements having the same functions as those according to the aforesaid embodiments are given the same reference numerals and their descriptions are omitted.

Figure 12:
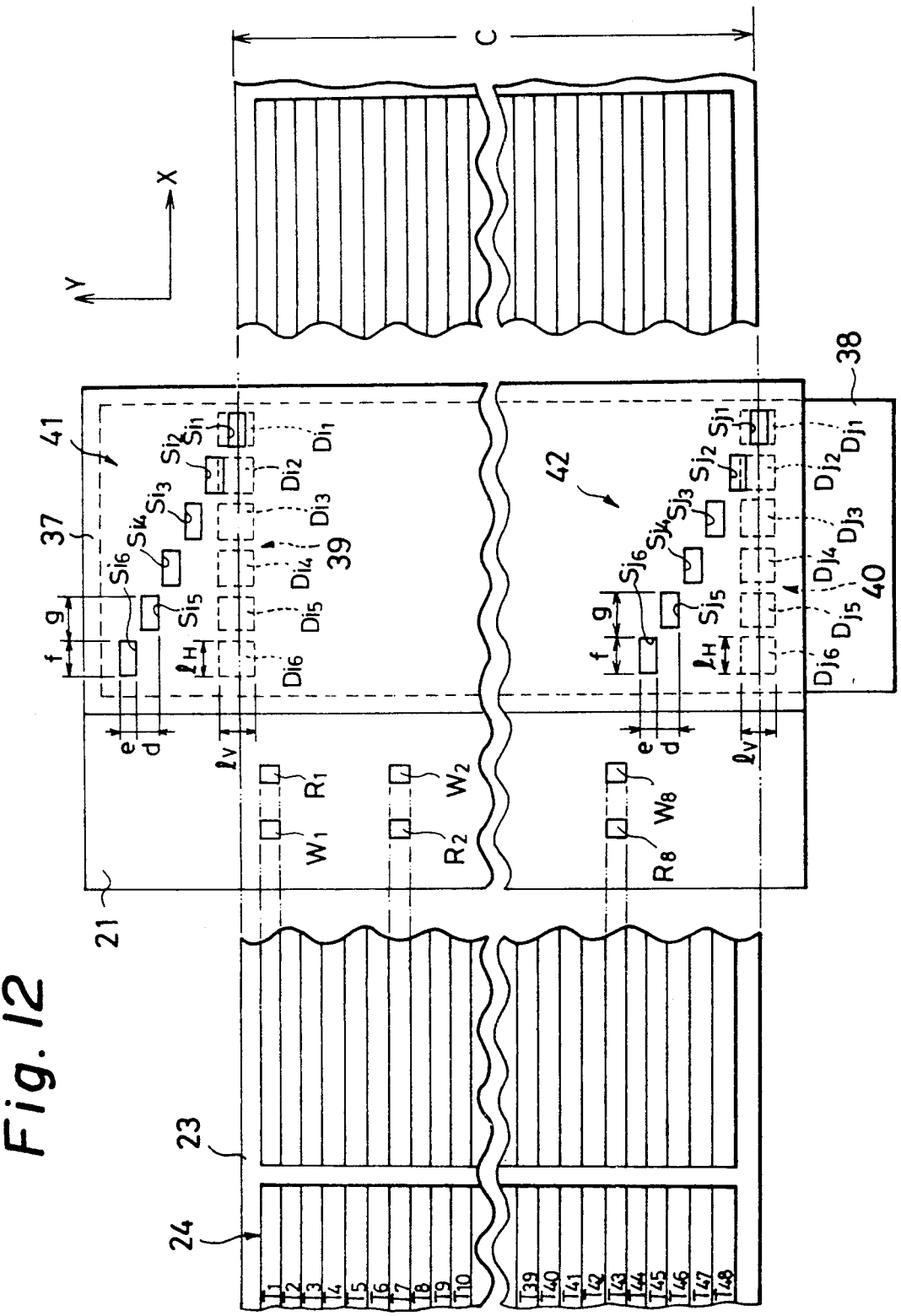
FIG. 12 is a front elevational view which illustrates the relative positions among the magnetic tape, the combination head, the light-receiving device and openings formed in the slit plate.
Figure 13A:
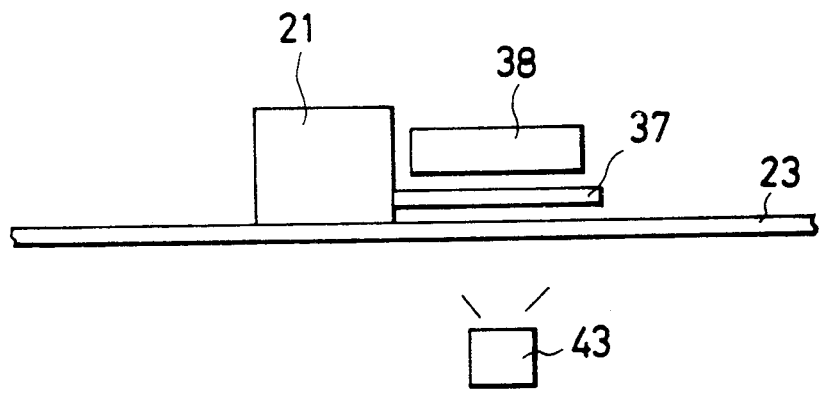
FIG. 13a is a schematic plan view which illustrates the relative positions among the magnetic tape, the combination head, the light-receiving device holding member and the slit plate.
Figure 13B:
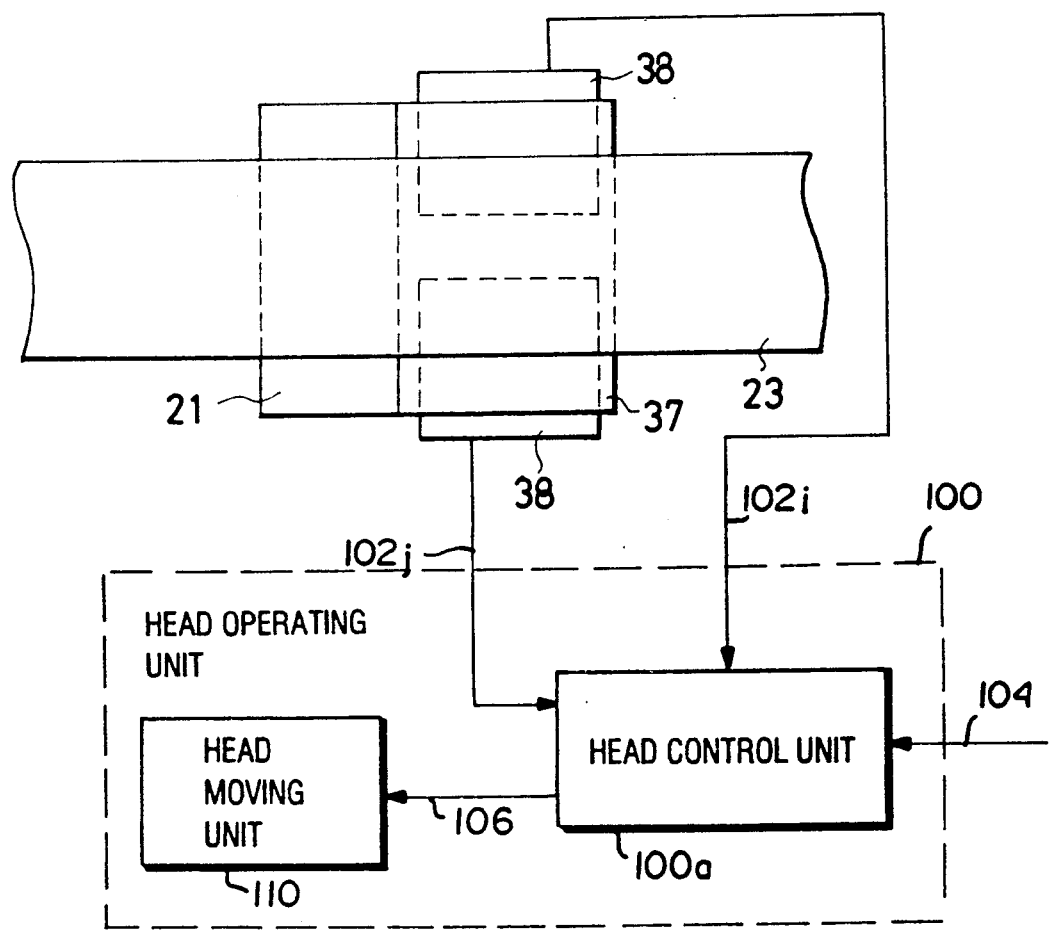
FIG. 13b is a front elevational view which illustrates the relative positions among the magnetic tape, the combination head, the light-receiving device holding member and the slit plate.

As shown in FIGS. 12, 13a and 13b, the magnetic recording/reproducing apparatus includes the combination head for recording and reproducing data from the magnetic tape 23, the combination head 21 having a slit plate 37 integrally formed with the combination head 21. The structures of the magnetic tape 23 and the combination head 21 are the same as those according to the fifth embodiment. The weaving of the magnetic tape 21 is restricted to ±50 μm or less by flanges or the like (omitted from illustration) for restricting the ±Y directional end of the magnetic tape 21.

The light-receiving device holding member 38 is secured to the slit plate 37 on the side opposite to the side which confronts the magnetic tape 23, the light-receiving device holding member 38 being independently formed from the combination head 21 and the slit plate 37.

The light-receiving device holding member 38 has light receiving device groups 39 and 40 which respectively consist of six light receiving devices $Di_1$ to $Di_6$ and $Dj_1$ to $Dj_6$ at the positions corresponding to the ±Y directional ends of the magnetic tape 23. The light receiving devices $Di_1$ to $Di_6$ and $Dj_1$ to $Dj_6$ are arranged such that the light receiving devices $Di_1$ and $Dj_1$ are disposed at the +X directional end and the other light receiving devices are successively disposed in the −X direction to form a line at a pitch g. Furthermore, their Y-directional centers coincide with the ±Y-directional end of the magnetic tape 23. The above-described light receiving devices $Di_1$ to $Di_6$ and $Dj_1$ to $Dj_6$ are respectively arranged to independently receive light which passed through the ±Y-directional end of the magnetic tape 23 and openings $Si_1$ to $Si_6$ and $Sj_1$ to $Sj_6$ to be described later. The light receiving surfaces of the light receiving device $Di_1$ to $Di_6$ and those $Dj_1$ to $Dj_6$ are arranged such that the Y directional width $l_v$ is larger than the Y directional width e of openings $Si_1$ to $Si_6$ and $Sj_1$ to $Sj_6$, and the X directional width $l_H$ is smaller than the above-described pitch g. The output levels for a unit area of the light receiving devices $Di_1$ to $Di_6$ and $Dj_1$ to $Dj_6$ are arranged to be the same.

The above-described slit plate 37 has an opening group 41 consisting of six openings $Si_1$ to $Si_6$ and serving as an opening group at an end portion at a positions corresponding to the light receiving devices $Di_1$ to $Di_6$. On the other hand, opening group 42 consisting of six openings $Sj_1$ to $Sj_6$ and serving as an opening group at another end portion at positions corresponding to the light receiving devices $Dj_1$ to $Dj_6$. The openings are provided by six so as to correspond to the number of the tracks $T_1$ to $T_6$ in a range in which, for example, the recording head $W_1$ and the reproducing head $R_1$ can move which form pairs. The openings $Si_1$ to $Si_6$ and $Sj_1$ to $Sj_6$ move in accordance with the ±Y directional movement of the combination head 21 since the slit plate 37 is integrally formed with the combination head 21. Each of the openings $Si_1$ to $Si_6$ is arranged to have a Y-directional width e (e = 100 μm) so as to correspond to the weaving of the magnetic tape 23. On the other hand, their X-directional width is arranged to be a width f with which a sufficient output can be obtained from the light receiving devices $Di_1$ to $Di_6$ and $Dj_1$ to $Dj_6$. The openings $Si_1$ to $Si_6$ and $Sj_1$ to $Sj_6$ are arranged such that the openings $Si_1$ and $Sj_1$ are disposed at the +X directional end and at the −Y directional end and the openings $Si_2$ to $Si_6$ and $Sj_2$ to $Sj_6$ are respectively and successively disposed in the +Y direction at the same pitch d (d = 120 μm) as the track pitch of the magnetic tape 23 and at a pitch g in the −X direction. Furthermore, the light receiving devices $Di_1$ to $Di_6$ and the light receiving devices $Dj_1$ to $Dj_6$ are shifted by ¼ inch which corresponding to the width of the magnetic tape 23 in the direction Y. According to this embodiment, when for example, the recording head $W_1$ and the reproducing head $R_1$ of the combination head 21 are at the track position $T_1$, the Y-directional centers of the openings $Si_1$ and $Sj_1$ coincide with the centers of the light receiving devices $Di_1$ and $Dj_1$, that is, the ±Y directional ends of the magnetic tape 23.

The above-described light receiving devices $Di_1$ to $Di_6$ and $Dj_1$ to $Dj_6$ are connected to the head operating unit 100. The head operating unit feedback-controls the combination head 21 to move it in the ±Y direction of the magnetic tape 23 such that the difference in the output between light receiving devices $Di_1$ to $Di_6$ and $Dj_1$ to $Dj_6$ which form pairs becomes zero when the combination head 21 has been shifted to each of the relative positions between the recording heads $W_1$ to $W_8$ and the reproducing heads $R_1$ to $R_8$ and the tracks $T_1$ to $T_{48}$. As a result, the relative position between the magnetic tape 23 and the combination head 21 is maintained at a predetermined position.

In the above regard, as shown in FIG. 13b, the head operating unit 100 includes a head control unit 100a and a head moving unit 110. The head control unit 100a is connected to receive output signals from the devices $Db_1$ to $Db_6$ on lines 102i and output signals from the devices $Dj_1$ to $Dj_6$ on lines 102j. As understood from the ensuing discussion, the head control unit 100a also receives an "end of reciprocation" signal on line 104. Further, the head control unit 100a applies a control signal on line 106 to the head moving unit 110. The head moving unit 110 is described in more detail in connection with FIGS. 14 and 15.

As shown in FIGS. 13a, 13b, the light emitting unit 43 capable of emitting light to the light receiving devices 39 and 40 are provided at the positions confronting the above-described light receiving device groups 39 and 40 with the ±Y directional end of the magnetic tape 23 and the slit plate 37 disposed therebetween. At this time, the head operating unit feedback-controls to calculate the difference in the output between the light receiving device Di1 and the light receiving device $Dj_1$ due to incident light from the light emitting unit 43 via the openings $Si_1$ and $Sj_1$ formed in the slit plate 37 and the ±Y directional end of the magnetic tape 23. The combination head 21 is operated such that the difference in the output becomes zero. Therefore, the combination head 21 moves so as to follow the weaving of the magnetic tape 23. As a result, the relative positions between the combination head 21 and the magnetic tape 23 can be maintained correctly. When the magnetic tape 23 is allowed to run in the direction X in this state, data on the tracks $T_1$, $T_{13}$, $T_{25}$ and $T_{37}$ is reproduced by the reproducing heads $R_1$, $R_3$, $R_5$ and $R_7$. When the magnetic tape 23 is allowed to run in the −X direction, data on the tracks $T_7$, $T_{19}$, $T_{31}$ and $T_{43}$ is reproduced by the reproducing heads $R_2$, $R_4$, $R_6$ and $R_8$.

When the reproduction of data for one reciprocation has been completed, the combination head 21 is moved so as to make the following differences in the following outputs zero: when data on the tracks $T_2$, $T_{14}$, $T_{26}$ and $T_{38}$ and data on the tracks $T_8$, $T_{20}$, $T_{32}$ and $T_{44}$ is reproduced, the output difference between the light receiving devices $Di_2$ and $Dj_2$ due to incident light via the openings $Si_2$ and $Sj_2$ and the ±Y directional end of the magnetic tape 23; when data on the tracks $T_3$, $T_{15}$, $T_{27}$ and $T_{39}$ and data on the tracks $T_9$, $T_{21}$, $T_{33}$ and $T_{45}$ is reproduced, the output difference between the light receiving devices $Di_3$ and $Dj_3$ due to incidental light via the openings $Si_3$ and $Sj_3$ and the ±Y directional end of the magnetic tape 23; when data on the tracks $T_4$, $T_{16}$, $T_{28}$ and $T_{40}$ and data on the tracks $T_{10}$, $T_{22}$, $T_{34}$ and $T_{46}$ is reproduced, the output difference between the light receiving devices $Di_4$ and $Dj_4$ due to incident light via the openings $Si_4$ and $Sj_4$ and the +Y directional ends of the magnetic tape 23; when data on the tracks $T_5$, $T_{17}$, $T_{29}$ and $T_{41}$ and data on the tracks $T_{11}$, $T_{23}$, $T_{35}$ and $T_{47}$ is reproduced, output difference between the light receiving devices $Di_5$ and $Dj_5$ due to incidental light via the openings $Si_5$ and $Sj_5$ and the ±Y directional ends of the magnetic tape 23; when data on the tracks $T_6$, $T_{18}$, $T_{30}$ and $T_{42}$ and data on the tracks $T_{12}$, $T_{24}$, $T_{36}$ and $T_{48}$ is reproduced, the output difference between the light receiving devices $Di_6$ and $Dj_6$ due to incident light via the openings $Si_6$, $Sj_6$ and the ±Y directional ends of the magnetic tape 23. As a result, the track switching operation and the track following up operation can be performed and the data reproduction from all of the tracks $T_1$ to $T_{48}$ is completed. The above-described operation is applied to the recording operation.

The head control unit 100a of the head operating unit 100 thus receives the end of reciprocation signals on line 104 in an expected sequence according to the serpentine track traversal pattern. Upon receiving an end of reciprocation signal, the head control unit 100a selects the light receiving output elements whose output signals are to be set in a known predetermined relation for the next reciprocation. In conventional feedback manner, the head control unit 100a of the head operating unit 100 receives on lines 102i and 102j the output signals from the light receiving elements, and applies the necessary corrective feedback signal on line 106 to the head moving unit in order to ensure that the signals are in the required predetermined relation.

Next, a seventh embodiment of the present invention will be described. According to this embodiment, an example of a serpentine magnetic recording/reproducing apparatus is provided. The magnetic recording/reproducing apparatus according to this embodiment is structured such that a combination head having recording heads and the reproducing heads whose number is smaller than the number of the tracks of the magnetic tape is allowed to run once in the direction of the magnetic tape on which a plurality of tracks are formed in parallel in the direction in which the tape runs. As a result, a plurality of tracks are simultaneously subjected to the recording or the reproducing. Furthermore, the combination head is moved by the head operating means in the widthwise direction of the magnetic tape by the track switching operation. As a result, data is recorded/reproduced from all of the tracks.

Next, the magnetic recording/reproducing apparatus according to this embodiment will be described with reference to FIGS. 14, 15 and 16.

Figure 14:
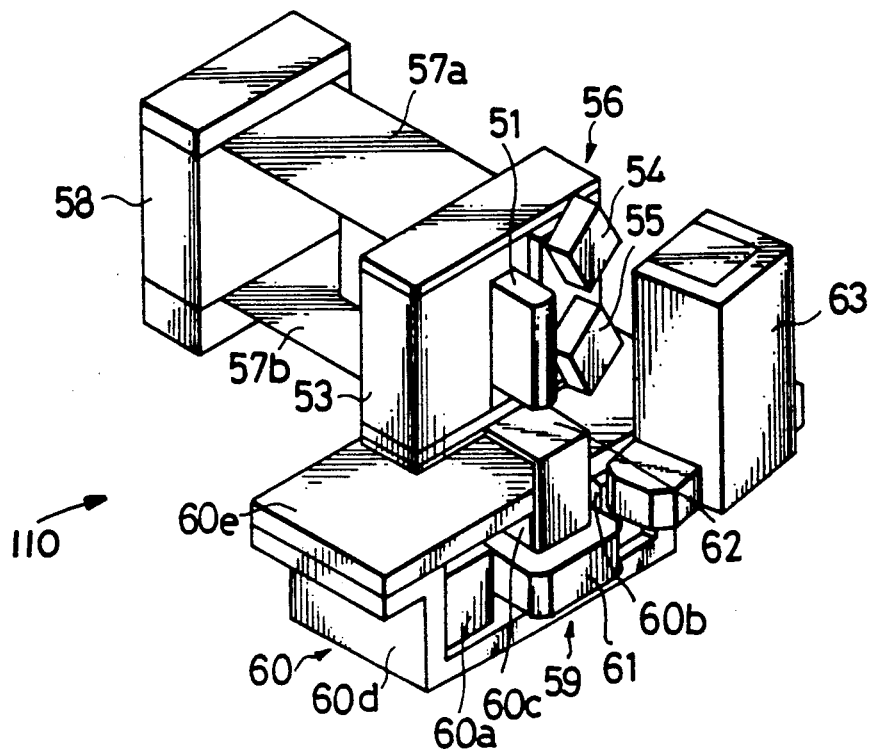
FIG. 14 is a perspective view which illustrates the magnetic tape in non-loaded state.

FIG. 14 is a perspective view which illustrates the magnetic recording/reproducing apparatus to which no magnetic tape has been loaded. FIG. 15 illustrates a state in which the magnetic tape has been loaded.

A combination head 51 for recording or reproducing data from a magnetic tape 52 is fastened to a holder 53 serving as a member for holding the combination head 51. Light-receiving groups 54 and 55 for detecting the vertical two ends of the magnetic tape 52 are secured to a portion in the vicinity of the combination head 51.

That is, a movable portion 56 is constituted by combining the combination head 51, the light receiving device groups 54 and 55 and the holder 53. The holder 53 is fastened between the free ends of parallel leaf springs 57a and 57b whose one ends are secured to a fastening portion 58. The fastening portion 58 is fastened to a main frame (omitted from illustration) of the magnetic recording/reproducing apparatus. As a head moving unit 110 for moving the combination head 51 to the widthwise direction of the magnetic tape 52, a voice coil type linear motor 59 having no friction loss and dead zone is employed. The voice coil type linear motor 59 includes a square yoke type magnetic circuit 60 secured to the main frame and a coil 61 for generating moving force. The above-described movable portion 56 is connected to the coil 61 by the bobbin 62 which connects the movable portion 56 and the coil 61 such that it acts in synchronization with the movement of the coil 61 and the power generated by the coil 61 passes through a portion in the vicinity of the center of gravity of the movable portion 56. As a result of the above-described structure, precise servo control can be performed in the operation of the combination head 51.

Reference numerals 60a and 60b represent magnets of the voice coil type linear motor 59. Reference numeral 60 represents a central magnet into which the coil 61 is inserted from outside. Reference numeral 60d represents an outside magnetic pole, 60e represents a common magnetic pole positioned in closely contact with the terminals of each of outer magnetic poles confronting the central magnetic pole 60c, the outer magnetic pole 60d and the outer magnetic pole 60e. Thus, a closed circuit of the magnetic circuit 60 is constituted so that the combination head 51 does not receive an influence of a leaked flux from the magnetic circuit 60. Therefore, the influence of the leaked flux from the voice coil type linear motor 59 upon the combination head 51 and the magnetic tape 52 can be reduced to ten and several Oes. Furthermore, the main frame is provided with a light emitting device 63 position in the opposite direction to the light receiving devices 54 and 55 with the magnetic tape 52 is disposed therebetween and fixed guides 64a and 64b disposed on the both sides of the combination head 51 and guiding the magnetic tape 52.

Figure 16:
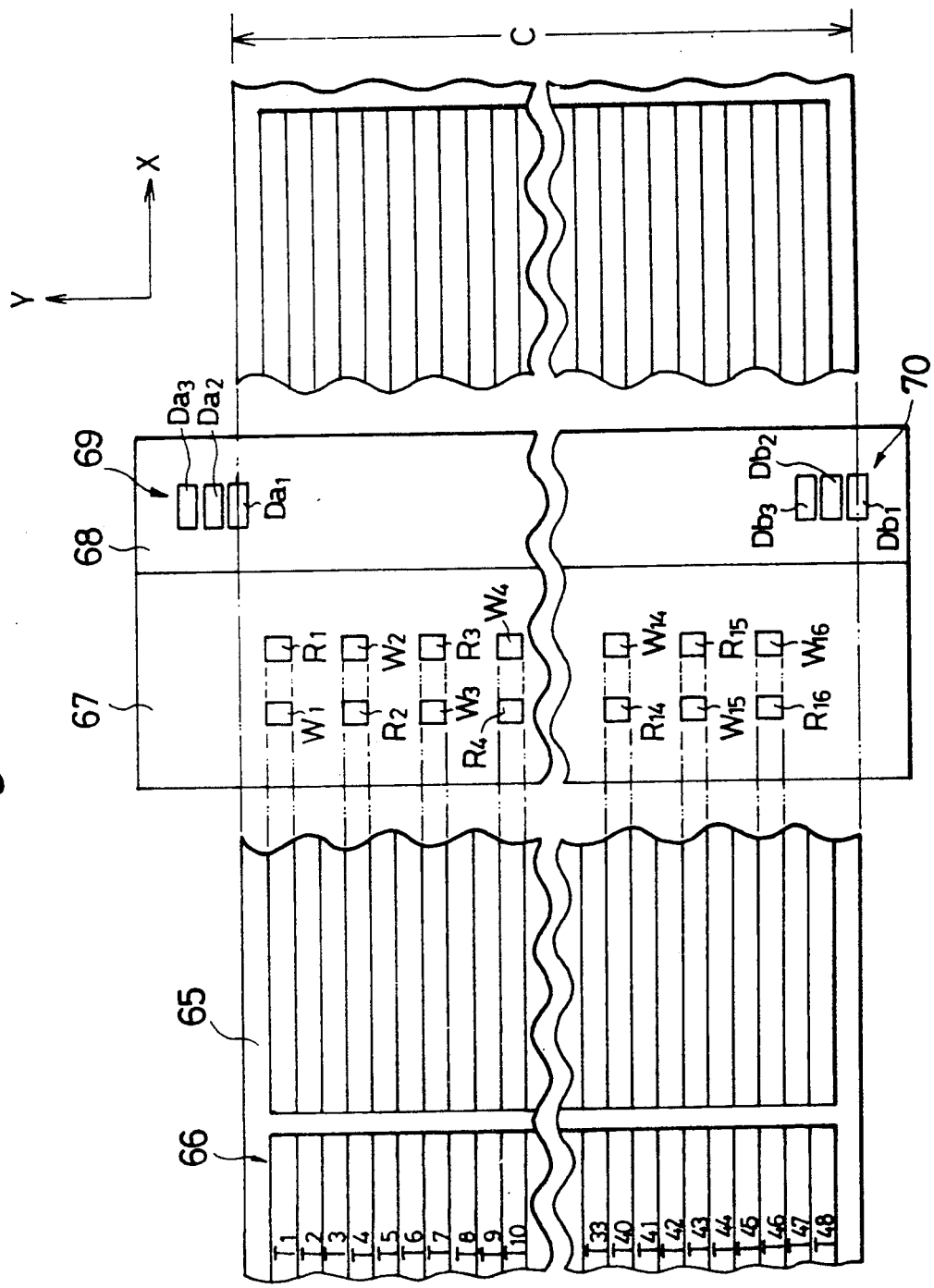
FIG. 16 illustrates the structure of a tracking control.

FIG. 16 illustrates the structure of the tracking control according to this embodiment. As shown in FIG. 16, the magnetic tape 65 has a track group 66 consisting of 48 tracks $T_1$ to $T_{48}$ at the same pitch in the direction Y. According to this embodiment, the width c of the magnetic tape 65 is arranged to be $\frac{1}{4}$ inch and the track pitch is arranged to be 120 μm. The combination head 67 includes 16 recording heads $W_1$ to $W_{16}$ and reproducing heads $R_1$ to $R_{16}$ which are formed integrally. The recording heads $W_1$ to $W_{16}$ are disposed in the direction Y at a pitch of 360 μm. The reproducing heads $R_1$ to $R_{16}$ form a pair with the corresponding recording heads $W_1$ to $W_{16}$ in the X or $-X$ direction. The recording heads $W_1$ to $W_{16}$ and the reproducing heads $R_1$ to $R_{16}$ each forming a pair are alternately disposed in the direction Y.

In the combination head 67 thus structured, when the magnetic tape 65 is allowed to run in the direction X, 8 recording heads $W_{2n-1}$ (n=1 to 8) perform the recording operation, while when the magnetic tape 65 is allowed to run in the direction $-C$, 8 recording heads $W_{2n}$ (n=1 to 8) perform the recording. Furthermore, the combination head 67 is moved in the direction $-Y$ whenever the magnetic tape reciprocates. Therefore, the relative position with respect to the magnetic tape 65 is changed three times. As a result, all of the 48 tracks $T_1$ to $T_{48}$ are subjected to the data recording/reproducing. The holder 68 has, at its portion corresponding to the $+Y$ directional end of the magnetic tape 65, a light-receiving device group 69 consisting of three light receiving devices $Da_1$ to $Da_3$ and disposed at an end. Furthermore, a light-receiving device group 70 consisting of three light receiving devices $Db_1$ to $Db_3$ and disposed at the other end is provided in a portion corresponding at the $-Y$ directional end. The number of the provided light receiving devices 69 and 70 corresponds to the number of the tracks $T_1$ to $T_3$ in a range in which, for example, the pair of the recording head $W_1$ and the reproducing head $R_1$ of the combination head 67. The light receiving devices $Da_1$ to $Da_3$ and $Db_1$ to $Db_3$ are arranged to have the same output level for a unit light receiving area. Furthermore, they are integrally formed with the combination head 67 by the holder 68. As a result, they can be moved in accordance with the movement of the combination head 67 in the $\pm$direction Y. The light receiving devices $Da_1$ to $Da_3$ and $Db_1$ to $Db_3$ are disposed at the same pitch (120 μm) as the track pitch of the magnetic tape 65, and the light receiving device $Da_1$ and $Db1$ are shifted from each other in the direction Y by the width (¼ inch) of the magnetic tape 65. Furthermore, when, for example, the recording head $W_1$ and the reproducing head $R_1$ of the combination head 67 are at the track position $T_1$, the centers of the light receiving devices $Da_1$ and $Db_1$ coincide with the $\pm Y$ directional ends of the magnetic tape 65.

As a result of the above-described structure, when data on all of the tracks $T_1$ to $T_{48}$ is reproduced, the head operating unit is feedback-controlled so as to make the output difference between the light receiving devices $Da_1$ and $Db_1$ becomes zero when the magnetic tape 65 is allowed to run in the direction X. With the thus realized precise tracking control performed, data on 8 tracks $T_{6n-5}$ (n = 1 to 8) is reproduced by 8 reproducing heads $R_{2n-1}$ (n = 1 to 8). When the reproduction to the end portion of the magnetic tape 65 has been ended, the magnetic tape 65 is allowed to run in the direction $-X$. During this, the feedback control such that the output difference between the light receiving devices $Da_1$ and $Db_1$ is made zero is conducted so that the data on 8 tracks $T_1$ to $T_{6n-3}$ (n = 1 to 8) is reproduced by 8 reproducing head $R_{2n-1}$ (n = 1 to 8). Similarly, the track switching operation and the track follow-up operation are conducted. Thus, data on all of the tracks $T_1$ to $T_{48}$ is ended. The above-described operation is also applied to the recording operation.

Although the combination head 67 is held by a parallel leaf spring according to this embodiment, the present invention is not limited to the description above. A structure may be employed in which it is held by a shaft and a bearing in a sliding method.

Figure 15:
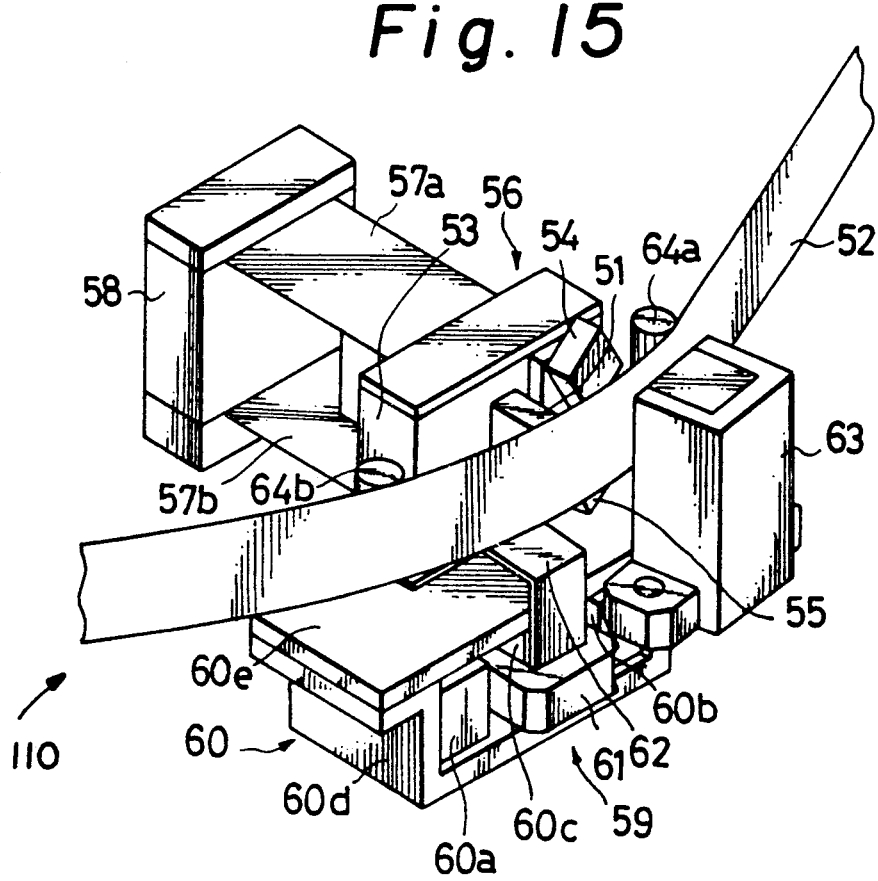
FIG. 15 is a perspective view which illustrates the magnetic tape in loaded state.
Figure 17:
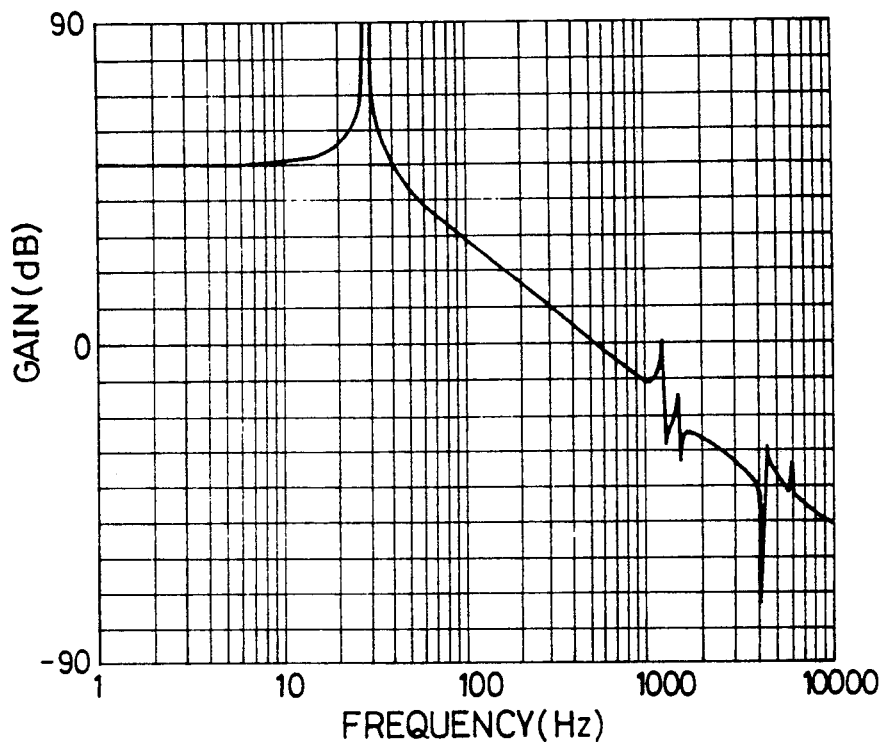
FIG. 17 illustrates the transfer function of the spring system of the parallel leaf spring supporting structure shown in FIGS. 14 and 15.

FIG. 17 illustrates the transfer function of the spring system of the parallel leaf spring supporting structure shown in FIGS. 14 and 15. As shown in FIG. 17, the second resonance frequency becomes 1.2 kHz with respect to the first resonance frequency 30 Hz. With the characteristics described above, the closed loop servo with the cutoff frequency of about 500 Hz can be obtained by performing a servo control such as the phase compensation. Therefore, the tape weaving of, for example, 100 Hz can be followup controlled at a compression ratio of about $-20$ to $-30$ dB.

Figure 18:
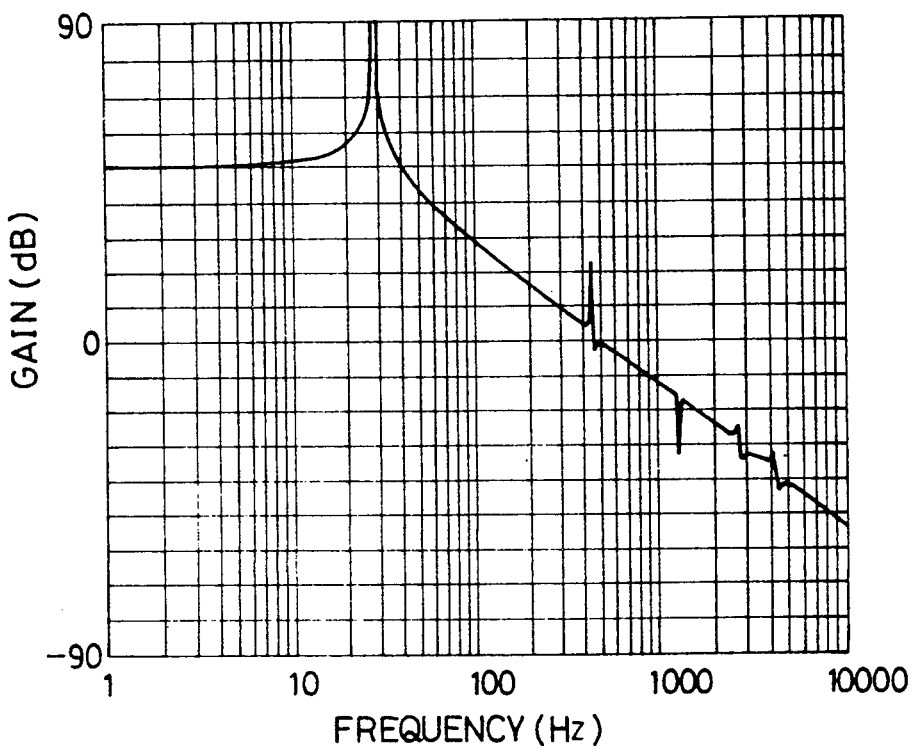
FIG. 18 illustrates the transfer function of the spring system when the combination head and the holder are not disposed between the parallel leaf springs with the axis of abscissa representing frequencies and the axis of ordinate representing gains.

FIG. 18 illustrates the transfer function for a structure in which the combination head 51 and the holder 53 are not supported between the parallel leaf springs 57a and 57b FIGS. 14 and 15. Since the second resonant frequency is about 450 Hz, the cutoff frequency becomes lowered excessively and the servo gain reduction becomes too lowered to conduct the closed loop servo. Therefore, a tracking control with a satisfactory followup characteristics cannot be conducted.

Since the voice type linear motor 59 is used to operate the combination head 51 and since the power generated by the linear motor 59 is arranged to pass through a portion in the vicinity of the center of gravity of the movable portion 56, the operation of the combination heads 51 can be precisely servo-controlled.

Many widely different embodiments of the present invention may be constructed without departing from the spirit and scope of the present invention. It should be understood that the present invention is not limited to the specific embodiments described in this specification, except as defined in the appended claims.

What is claimed is:

1. A head positioning system for changing the position of a plurality of heads relative to a width dimension of magnetic tape, the width dimension being perpendicular to a direction in which the tape travels, the heads traversing tracks on the tape arranged in parallel with each other in the direction in which the tape travels; the system comprising:

light emitting means located at a position facing a first side of the magnetic tape for emitting light toward the first side of the magnetic tape;

light receiving means for potentially receiving light emitted from the light emitting means, the light receiving means being located at a position facing a second side of the magnetic tape, the light receiving means comprising a plurality of light receiving elements, each of the light receiving elements producing an output signal related to reception of light;

head control means for producing a control signal, the head control means being connected to the light receiving elements comprising the light receiving means and being connected to receive an indication when the heads are to change tracks, the control signal being produced to establish a predetermined relation between the output signals of selected ones of the light receiving elements, the predetermined relation and the selected light receiving elements being dependent upon the track next to be traversed; and means responsive to the control signal for moving the heads relative to the width of the tape whereby the heads change tracks and for enabling the output signals of the selected ones of the receiving elements to acquire the predetermined relation.

2. An apparatus according to claim 1, wherein said magnetic heads include a plurality of writing heads and a plurality of reading heads in pairs, each pair of said pairs being so arranged that said plurality of writing heads and said plurality of reading heads are alternately positioned along said widthwise direction as well as along a moving direction of said magnetic tape, said magnetic heads are supported between free ends of two parallel leaf springs, said free ends being formed at end portions of said two parallel leaf springs, and wherein a voice coil type linear motor is provided, a magnetic circuit of said voice coil type linear motor being closed in a direction of said magnetic heads as well as in a direction of said magnetic tape.

3. An apparatus according to claim 2, wherein a movable portion is connected to a coil of said voice coil type linear motor and disposed between said free ends, said movable portion having said magnetic heads and a supporting member for supporting said magnetic heads, said movable portion being capable of synchronizing with a movement of said coil so as to transmit a power of said voice coil type linear motor through a portion which is situated in a vicinity of a center of gravity of said movable portion.

4. A method changing the position of a plurality of heads relative to a width dimension of magnetic tape, the width dimension being perpendicular to a direction in which the tape travels, the heads traversing tracks on the tape arranged in parallel with each other in the direction in which the tape travels; the method comprising:

emitting light toward a first side of the magnetic tape;

receiving, on a second side of the magnetic tape, the light emitted from the light receiving means with a plurality of light receiving elements, the light receiving elements producing an output signal related to the reception of light;

obtaining an indication when the heads are to change tracks; and then producing a control signal to establish a predetermined relation between the output signals of selected ones of the light receiving elements, the predetermined relation and the selection of the light receiving elements being dependent upon a track next to be traversed;

moving the selected ones of the light receiving elements, in response to the control signal, whereby the output signals of the selected ones of the light receiving elements acquire the predetermined relation; and moving the heads relative to the width of the tape, in response to the control signal, whereby the heads change tracks.

5. A magnetic recording/reproducing apparatus adapted to be used for a serpentine recording/reproducing system and capable of recording and/or reproducing a large amount of high density data with a narrow track width at a high speed by maintaining a tracking control, said apparatus having a plurality of magnetic heads for reading and/or writing data on a magnetic tape composed of a plurality of tracks which are arranged in parallel with each other in a direction in which said magnetic tape runs, said apparatus comprising:

means disposed at a position confronting one side of said magnetic tape for emitting light toward said one side of said magnetic tape along in a widthwise direction of said magnetic tape;

means coupled to said magnetic heads for receiving said light emitted from said light emitting means, said light receiving means having a plurality of light receiving elements disposed at a position confronting the other side of said magnetic tape so that outputs from said light receiving elements have a predetermined relation at a time when at least one of said magnetic heads is moved to a position of a predetermined track of said plurality of tracks; and means connected to both said light receiving means and said magnetic heads for controlling positions of said plurality of light receiving elements, at least one of said plurality of light receiving elements being positioned to receive said light emitted from said light emitting means and to achieve the predetermined relation at a time when said magnetic heads are moved in a predetermined range along said widthwise direction of said magnetic tape in accordance with said controlling means;

said light receiving means being integrally formed on said magnetic heads, and said plurality of light receiving elements including light receiving elements $Da_1$ to $Da_n$, where n representing a positive integer which satisfies a relation of $n \geq 3$, and said light receiving elements $Da_1$ to $Da_n$ being separated each other and disposed with predetermined intervals along in said widthwise direction of said magnetic tape.

6. An apparatus according to claim 5, wherein said light receiving element $Da_1$ is positioned in the most inward portion toward a mid portion of said magnetic tape in said widthwise direction among said light receiving elements $Da_1$ to $Da_n$.

7. An apparatus according to claim 6, wherein said light receiving element $Da_n$ is disposed at the most outward portion from said mid portion of said magnetic tape in said widthwise direction among said light receiving elements of $Da_1$ to $Da_n$, at a time when said light receiving element $Da_1$ is arranged to be a first light receiving element located in the most inward portion toward said mid portion of said magnetic tape.

8. An apparatus according to claim 7, wherein a pitch between an i-th light receiving element $Da_i$ and an i+1-th light receiving element $Da_{i+1}$ is set to be $d_i$, where i representing a positive integer satisfying a relation $1 \leq i \leq n-1$.

9. An apparatus according to claim 8, wherein said light receiving elements $Da_1$ to $Da_n$ hold relative positions $d_i = d$ when $i \leq 2$, and $d_i = (i-2) \times d$ when $3 \leq i \leq (n-1)$.

10. An apparatus according to claim 9, wherein said light receiving elements $Da_1$ to $Da_n$ are so disposed that a difference in outputs between any two of said light receiving elements situated adjacent each other is set to be an output from a respective light receiving element of said light receiving elements $Da_1$ to $Da_n$ in accordance with light emitted from said light emitting means when said magnetic tape is moved to an optional track position in said widthwise direction.

11. An apparatus according to claim 10, wherein a relation of outputs from three light receiving elements among said light receiving elements $Da_1$ to $Da_n$ is differed in accordance with relative positions between said magnetic tape and said magnetic heads.

12. An apparatus according to claim 11, wherein said light emitting means is so disposed that said light receiving elements $Da_1$ to $Da_n$ are confronted with said end portion of said magnetic tape situated therebetween by satisfying said relation of outputs from said three light receiving elements.

* * * * *